United States Patent
Ogawa

(10) Patent No.: US 8,610,694 B2
(45) Date of Patent: Dec. 17, 2013

(54) WRITING DEVICE, DISPLAY SHEET, AND ELECTRONIC DEVICE

(75) Inventor: Satoshi Ogawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 668 days.

(21) Appl. No.: 12/837,745

(22) Filed: Jul. 16, 2010

(65) Prior Publication Data

US 2011/0018843 A1    Jan. 27, 2011

(30) Foreign Application Priority Data

Jul. 27, 2009 (JP) .................................. 2009-174191
May 17, 2010 (JP) .................................. 2010-113510

(51) Int. Cl.
- *G06F 3/033* (2013.01)
- *G09G 3/34* (2006.01)
- *G08B 21/00* (2006.01)

(52) U.S. Cl.
USPC ...................... 345/179; 340/636.16; 345/107

(58) Field of Classification Search
USPC ......................................................... 345/179
See application file for complete search history.

(56) References Cited

U.S. PATENT DOCUMENTS

| | | | |
|---|---|---|---|
| 5,949,501 A | 9/1999 | Izuno et al. | |
| 2005/0162411 A1* | 7/2005 | Berkel van | 345/179 |
| 2005/0212748 A1* | 9/2005 | Matsuura et al. | 345/107 |
| 2010/0181902 A1* | 7/2010 | Kita | 313/504 |
| 2010/0277327 A1* | 11/2010 | Lee | 340/636.16 |

FOREIGN PATENT DOCUMENTS

| | | |
|---|---|---|
| JP | 09-282095 A | 10/1997 |
| JP | 2004-287068 A | 10/2004 |
| JP | 2005-115307 A | 4/2005 |
| JP | 2006-518511 A | 8/2006 |
| JP | A 2007-206846 | 8/2007 |
| WO | WO 2004/070512 A | 8/2004 |

* cited by examiner

*Primary Examiner* — Charles V Hicks
(74) *Attorney, Agent, or Firm* — Oliff & Berridge, PLC

(57) ABSTRACT

A writing device for displaying an image on a display layer having a containing portion in which electrophoretic particles are contained, includes: a casing; a power supply provided in the casing; an electrode portion which is provided in the casing and is electrically connected to the power supply; and a conductive portion which is provided in the casing and is electrically connected to the power supply, wherein display of the image is performed by electrically connecting the electrode portion to the display layer so that the conductive portion is electrically connected to the display layer.

9 Claims, 19 Drawing Sheets

WRITING DEVICE, DISPLAY SHEET, AND ELECTRONIC DEVICE

This application claims priority to Japanese patent applications No. 2009-174191 filed Jul. 27, 2009 and No. 2010-113510 filed May 17, 2010, and the said application is herein incorporated in the present specification.

BACKGROUND

1. Technical Field

The present invention relates to a writing device, a display sheet, and an electronic device.

2. Related Art

An electrophoretic display sheet using electrophoresis of particles is known as a constituent component of a display unit (image display unit) of electronic paper, for example. Moreover, as an input device for displaying a desired image on such an electrophoretic display sheet, a pen type input device used in a state gripped by a user like a writing material, such as a pencil or a ball-point pen, is known (for example, refer to JP-A-2007-206846).

An information input device disclosed in JP-A-2007-206846 includes a main body in which an electrophoretic display sheet (electronic paper) is placed, a pressing section which presses the electronic paper placed in the main body from above, and a pen type position indicator (input device). In this information input device, a matrix electrode portion (a plurality of dot electrodes) provided so as to be in contact with the electronic paper is formed in the main body, and a transparent electrode is formed in the pressing section.

Moreover, in the information input device disclosed in JP-A-2007-206846, when a user holds the pen type position indicator and draws a desired locus on the pressing section with the electronic paper interposed therebetween (that is, in a state where a transparent electrode and matrix electrodes face each other with the electronic paper interposed therebetween), a controller provided in the main body detects the locus (that is, coordinates of the pen type position indicator) on the basis of a predetermined signal transmitted from the pen type position indicator, selects dot electrodes corresponding to the locus from the matrix electrode portion (a plurality of dot electrodes), and applies a voltage between the selected dot electrodes and the transparent electrode. Then, a display color of a portion, which corresponds to the locus, on the display surface of the electronic paper changes, and an image corresponding to the locus is displayed on the display surface of the electronic paper accordingly.

In such an information input device, the pen type position indicator is not wired with the main body through a conductive wire (that is, the pen type position indicator is wireless). Accordingly, since the conductive wire or the like is entangled with neither the pen type position indicator nor a hand when moving the pen type position indicator on the pressing section, the information input device is easy to use (is excellent in terms of convenience).

In such an information input device, however, in order to realize the wireless function and excellent convenience, it is necessary to provide a circuit (resonance circuit) for transmitting a predetermined signal in the pen type position indicator and also to provide a controller, which detects the coordinates of the pen type position indicator, in the main body. As a result, there is a problem in that the configuration becomes complicated.

SUMMARY

An advantage of some aspects of the invention is that it provides a writing device with a simple configuration which does not need a wiring line and is excellent in terms of convenience, a display sheet with a simple configuration which can display a desired image using the writing device, and an electronic device with a simple configuration which includes the writing device and the display sheet and is excellent in terms of convenience.

According to an aspect of the invention, a writing device for displaying an image on a display layer having a containing portion, in which electrophoretic particles are contained, includes: a casing; a power supply provided in the casing; an electrode portion which is provided in the casing and is electrically connected to the power supply; and a conductive portion which is provided in the casing and is electrically connected to the power supply. Display of the image is performed by electrically connecting the electrode portion to the display layer so that the conductive portion is electrically connected to the display layer.

In this case, it is possible to provide a writing device with a simple configuration which does not need wiring with a display sheet and which is excellent in terms of convenience.

In the writing device according to the aspect of the invention, it is preferable that the casing is of a pen type.

In this case, since the writing device can be operated (used) like writing materials, such as a pencil and a ball-point pen, the operability of the writing device (usability by a user) is improved.

In the writing device according to the aspect of the invention, it is preferable that the electrode portion is formed at a distal end of the casing.

In this case, the electrode portion of the writing device can be contacted with the display surface of the display sheet more reliably.

In the writing device according to the aspect of the invention, it is preferable that the electrode portion is electrically connected to one electrode of the power supply and the conductive portion is electrically connected to the other electrode of the power supply.

In the writing device according to the aspect of the invention, it is preferable that the casing has a grip portion for gripping the casing and the conductive portion is provided in the grip portion so as to come in contact with a user's finger when a user grips the grip portion.

In this case, the conductive portion can come in contact with the display surface through the user's body (mainly, a hand). That is, it is possible to make the conductive portion electrically connect to the display surface indirectly using the user's body as a conductor path. As a result, the display sheet can be driven simply and reliably.

In the writing device according to the aspect of the invention, it is preferable that the conductive portion has a string form and at least a part of the conductive portion comes in contact with the display layer.

In this case, it is possible to make the conductive portion electrically connect to the display surface directly with a simple configuration. In addition, since the tip of the conductive portion is a free end, it is possible to smoothly operate the writing device without causing a situation where the conductive portion is entangled with the casing during the operation of the writing device.

According to another aspect of the invention, a display sheet on which an image is displayed by a writing device having a casing, a power supply provided in the casing, an electrode portion which is provided in the casing and is electrically connected to the power supply, and a conductive portion which is provided in the casing and is electrically connected to the power supply includes: a display layer which has a containing portion, in which electrophoretic particles are contained, and which has a first surface and a second surface facing the first surface; and an electrode layer provided on the first surface of the display layer. The electrode layer has an exposed portion exposed from the display layer in plan view of the display layer.

In this case, it is possible to provide a display sheet with a simple configuration which can display a desired image with a writing device and which is excellent in terms of convenience.

In the display sheet according to the aspect of the invention, it is preferable that the display layer has a plurality of corners in plan view of the display layer and at least one of the plurality of corners is missing. It is preferable that the exposed portion is provided so as to protrude from the missing portion in plan view of the display layer.

In this case, the exposed portion can be made not to be conspicuous.

According to still another aspect of the invention, an electronic device includes: a display sheet having an electrode layer and a display layer, which is provided on the electrode layer and has a containing portion in which electrophoretic particles are contained; and a writing device having a casing, a power supply provided in the casing, an electrode portion which is provided in the casing and is electrically connected to the power supply, and a conductive portion which is provided in the casing and is electrically connected to the power supply. Display of an image on the display layer is performed by electrically connecting the electrode portion to the display layer so that the conductive portion is electrically connected to the display layer.

In this case, it is possible to provide the electronic device with a simple configuration which is excellent in terms of convenience.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a writing device, a display sheet, and an electronic device according to preferred embodiments of the invention will be described in detail with reference to the accompanying drawings.

Electronic Device

First Embodiment

First, a first embodiment of an electronic device (electronic device of the invention), to which a writing device of the invention and a display sheet of the invention are applied, will be described.

Figure 1:
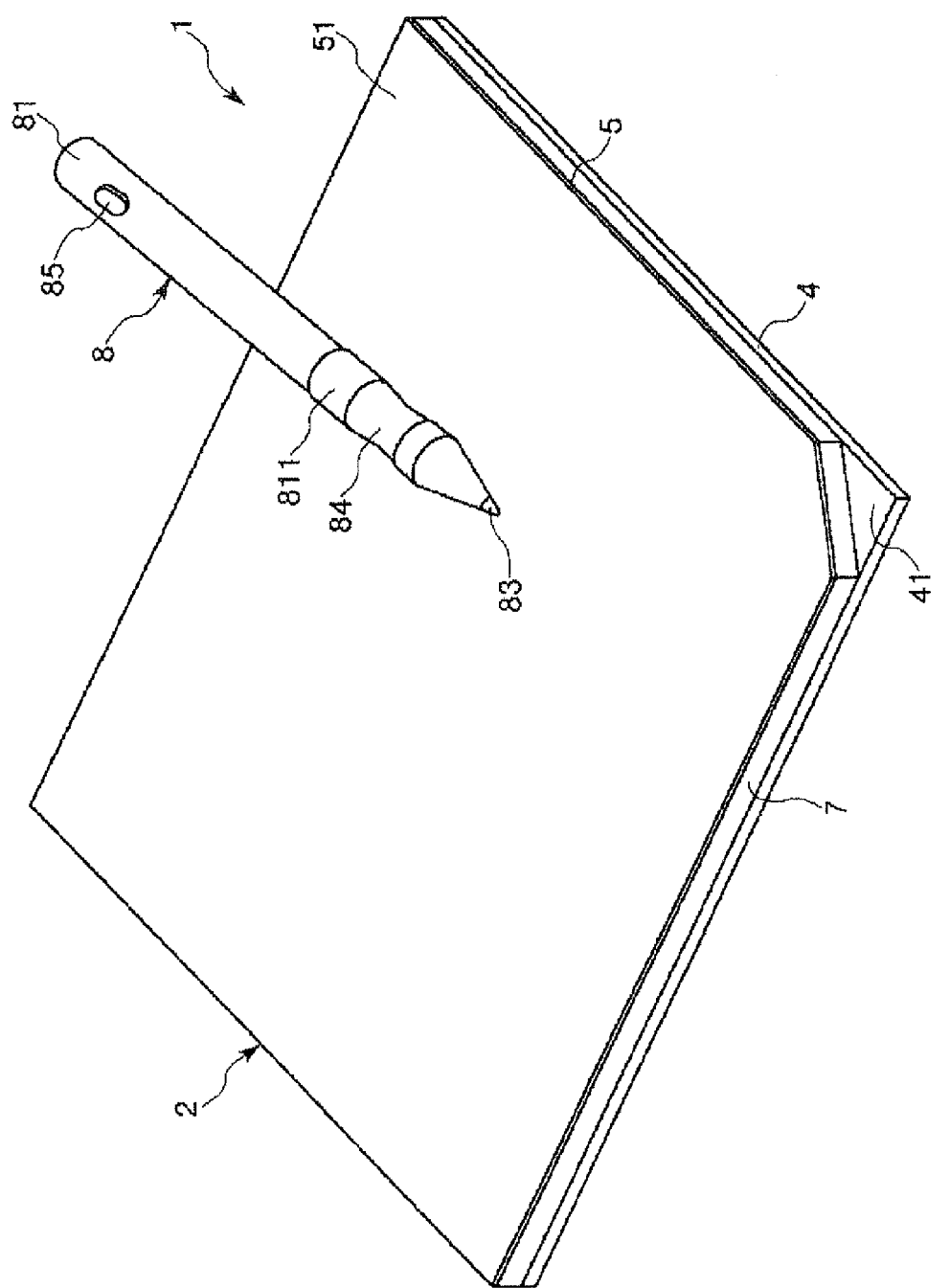
FIG. 1 is a perspective view schematically showing an electronic device according to a first embodiment of the invention.
Figure 2:
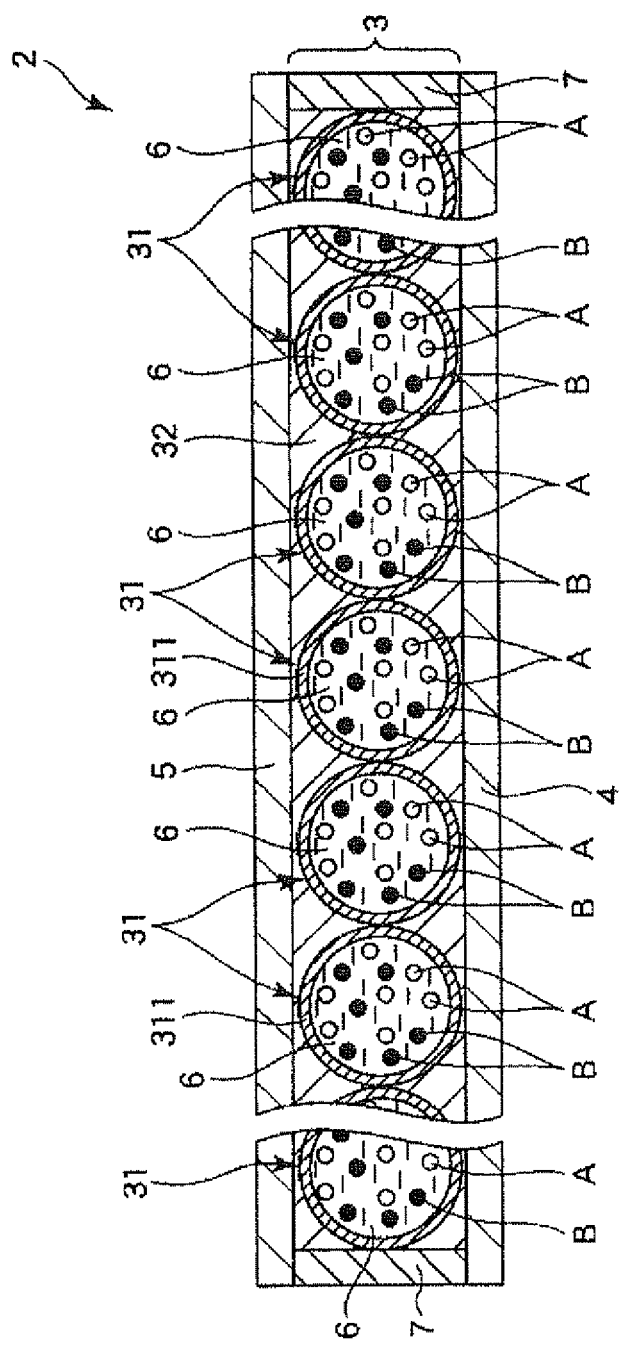
FIG. 2 is a sectional view of a display sheet provided in the electronic device shown in FIG. 1.
Figure 3:
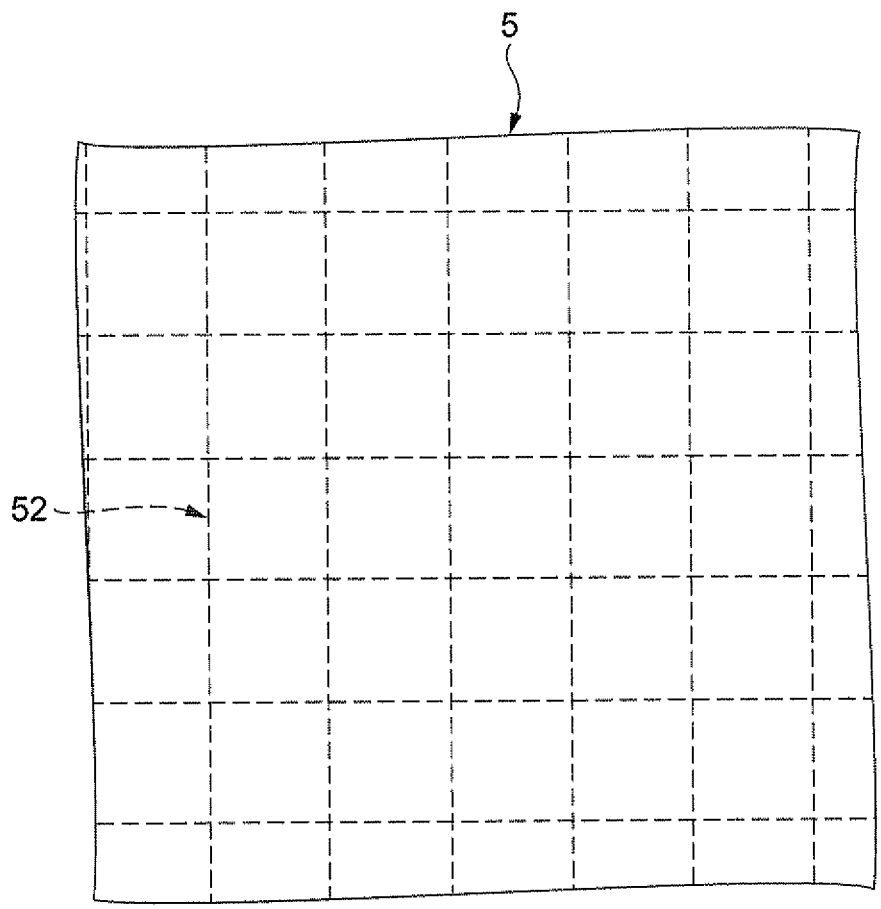
FIG. 3 is a sectional view showing a modification of a protective sheet provided in the display sheet shown in FIG. 2.
Figure 3:
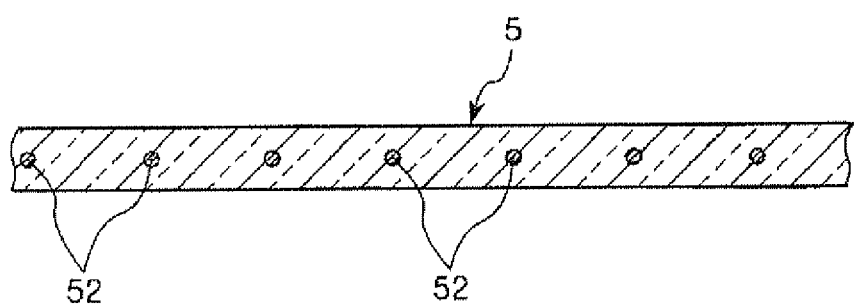
Figure 4:
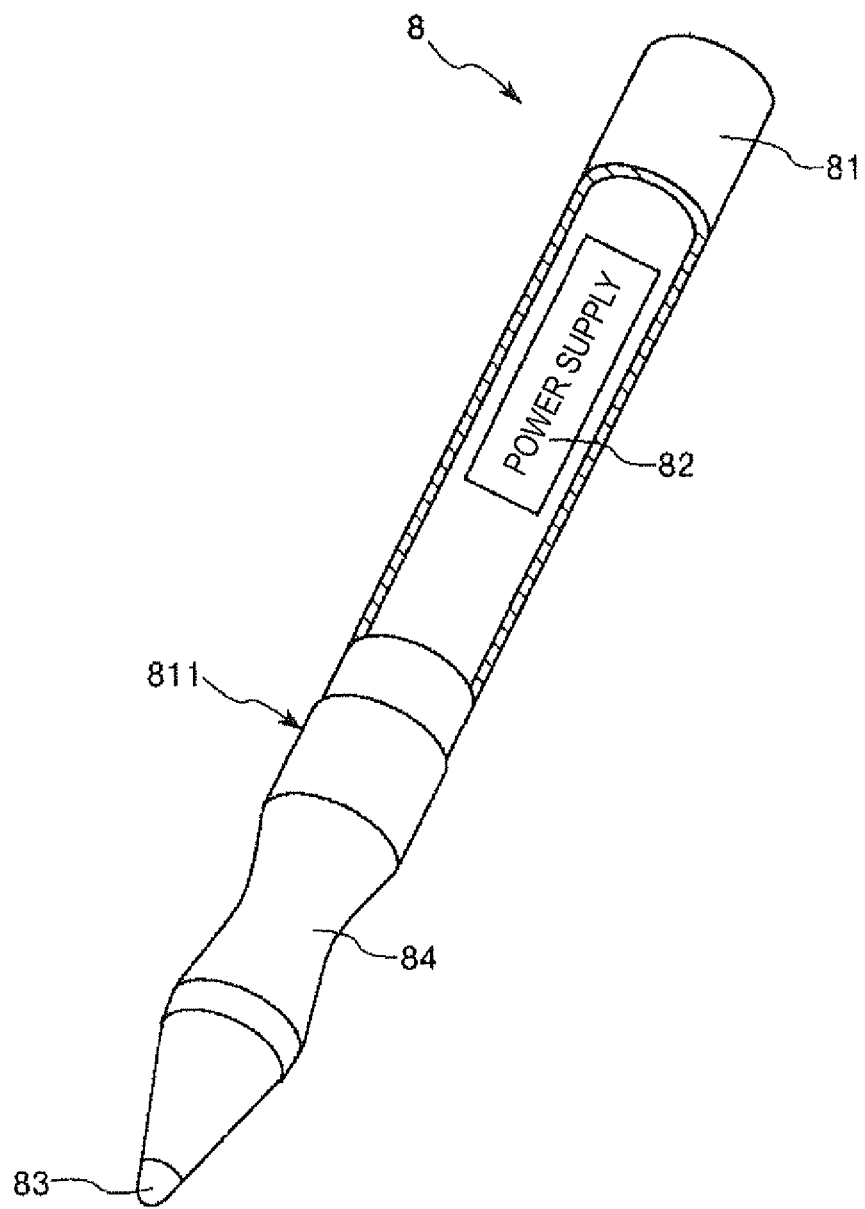
FIG. 4 is a perspective view showing the partial section of a writing device provided in the electronic device shown in FIG. 1.
Figure 5:
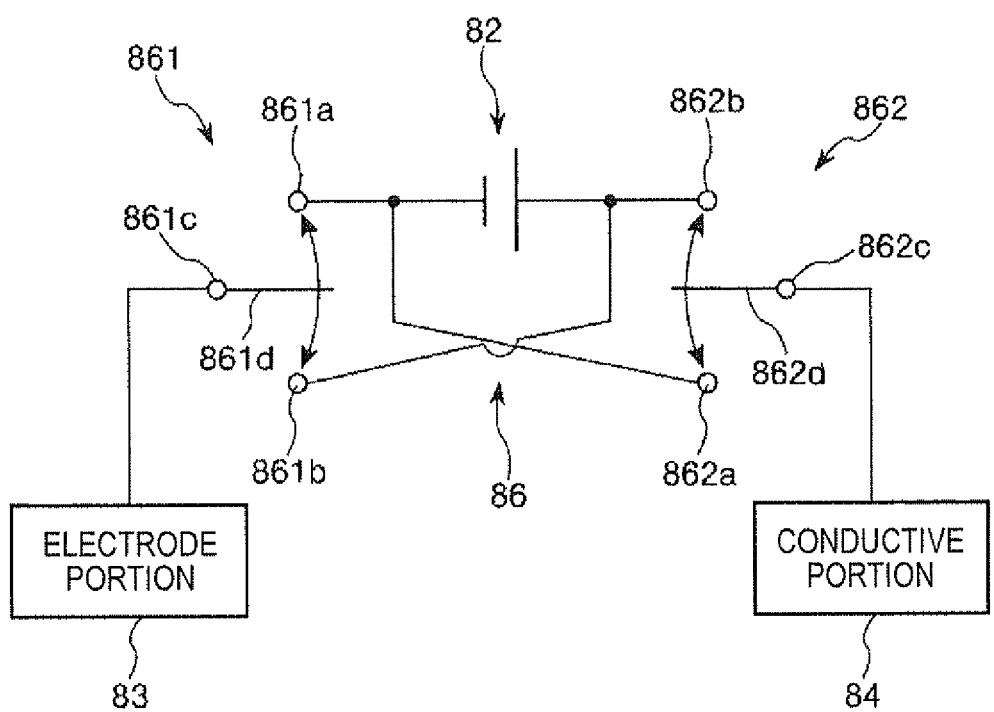
FIG. 5 is a diagram showing the configuration of a switch provided in the writing device shown in FIG. 4.
Figure 6:
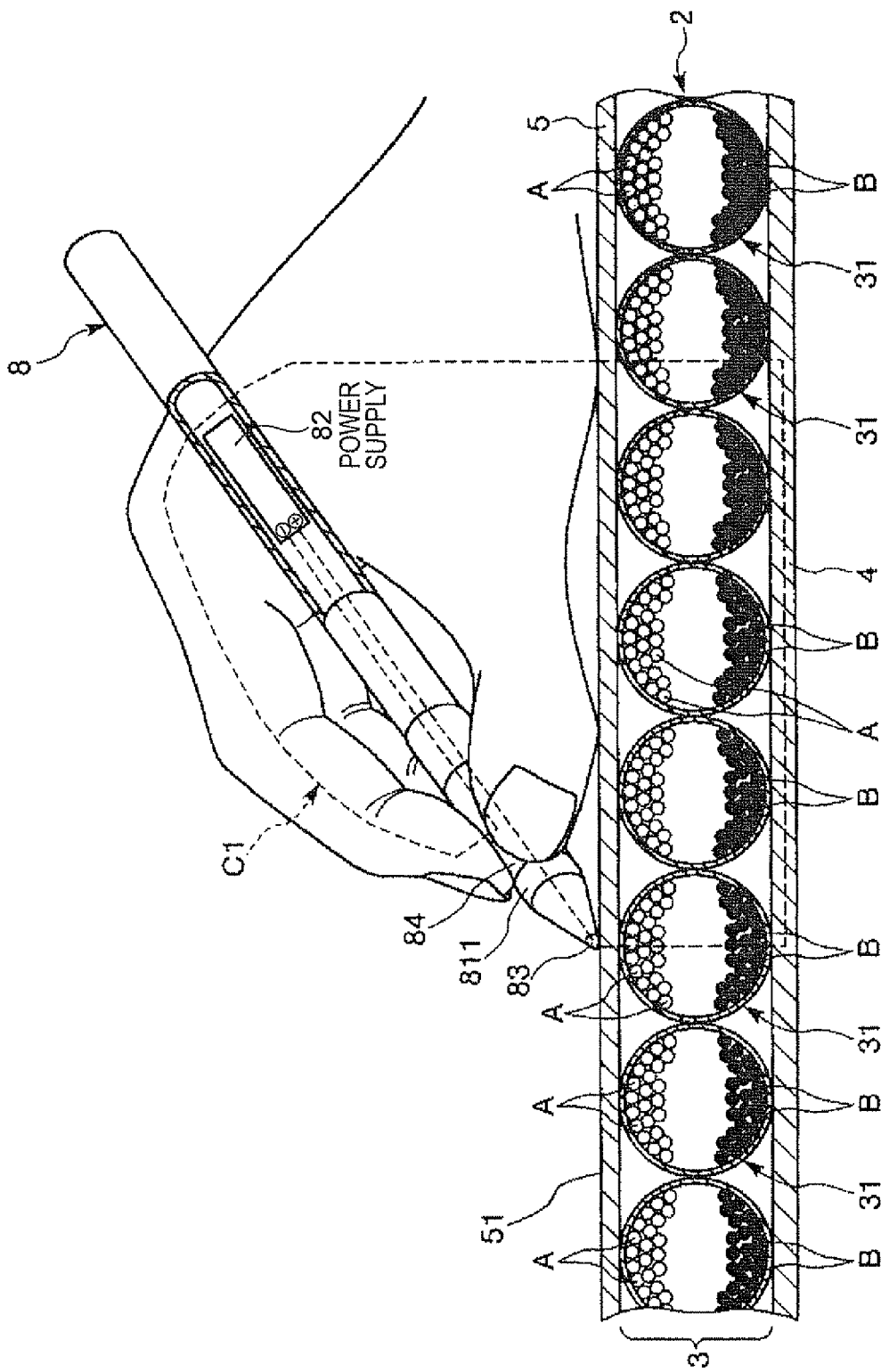
FIG. 6 is a diagram showing a state of writing an image on a display sheet.
Figure 7:
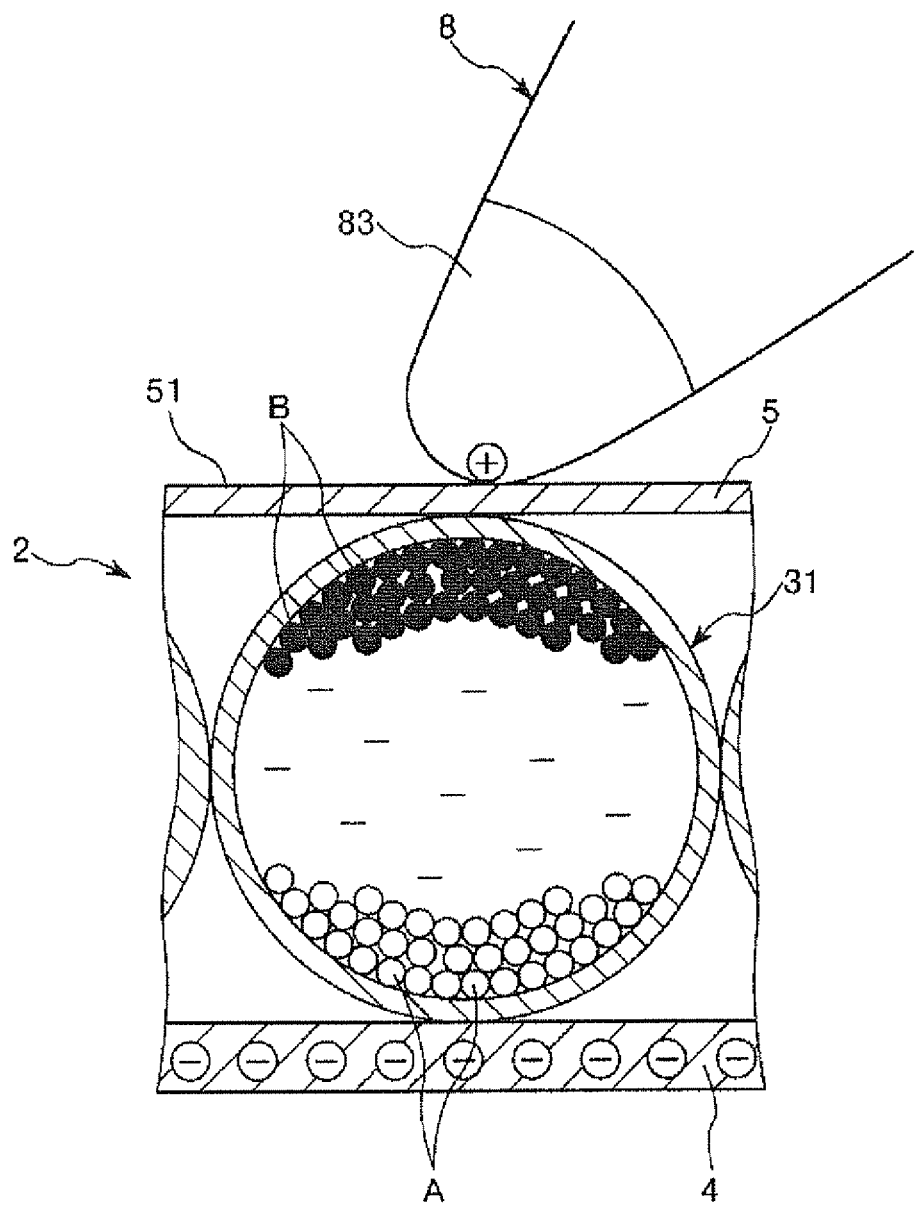
FIG. 7 is a partially enlarged view of FIG. 6.
Figure 8:
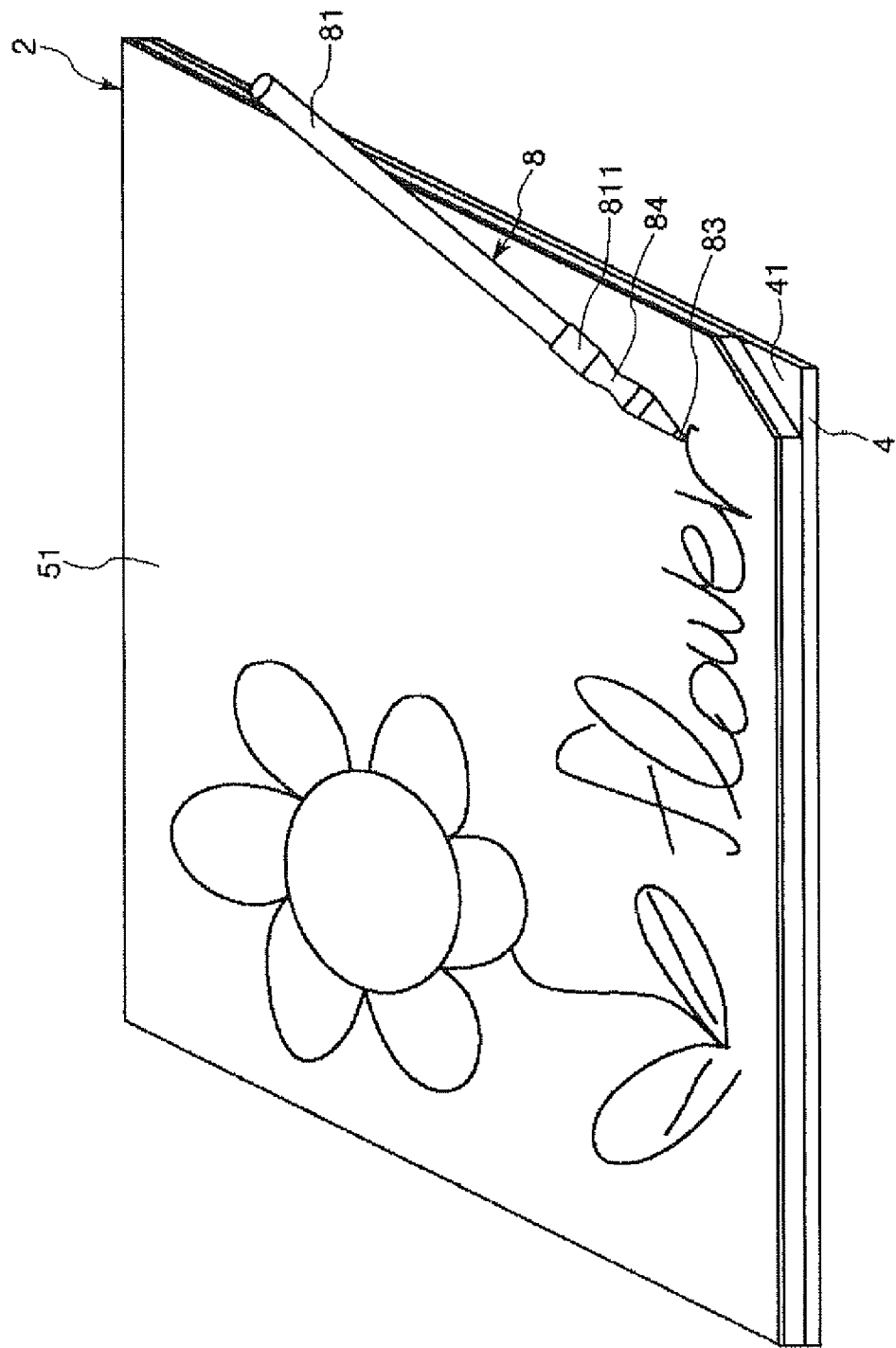
FIG. 8 is a diagram showing a display sheet on which a desired image is written.
Figure 9:
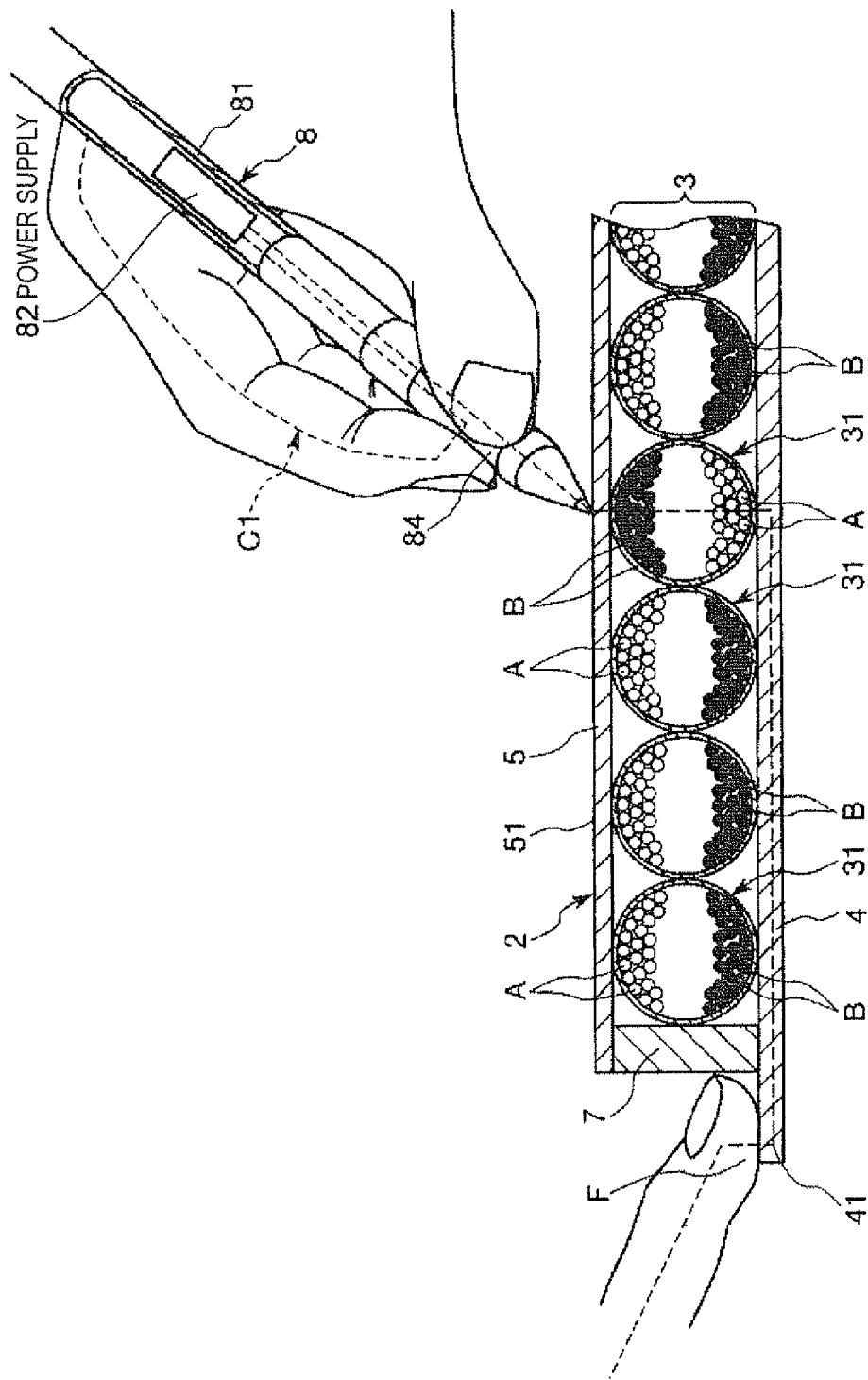
FIG. 9 is a diagram showing a state of writing an image on a display sheet.
Figure 10:
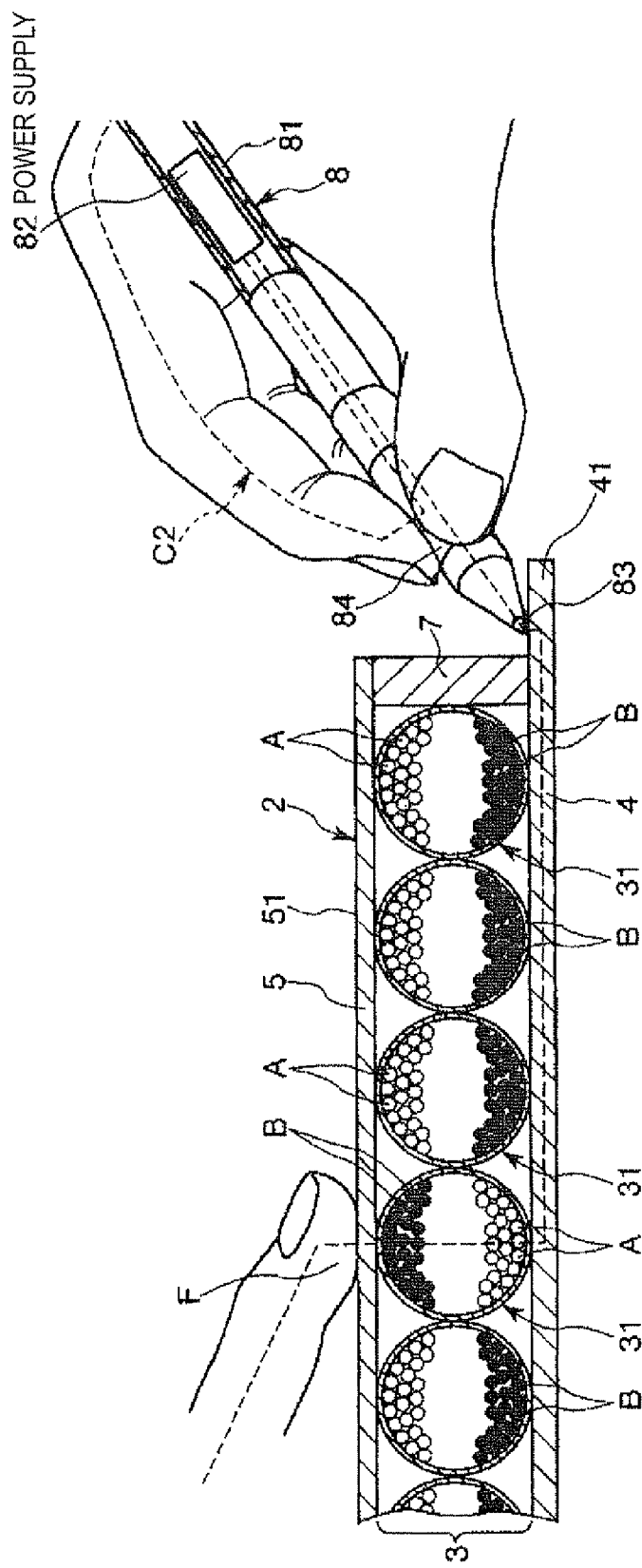
FIG. 10 is a diagram showing a state when erasing an image written on a display sheet.
Figure 11:
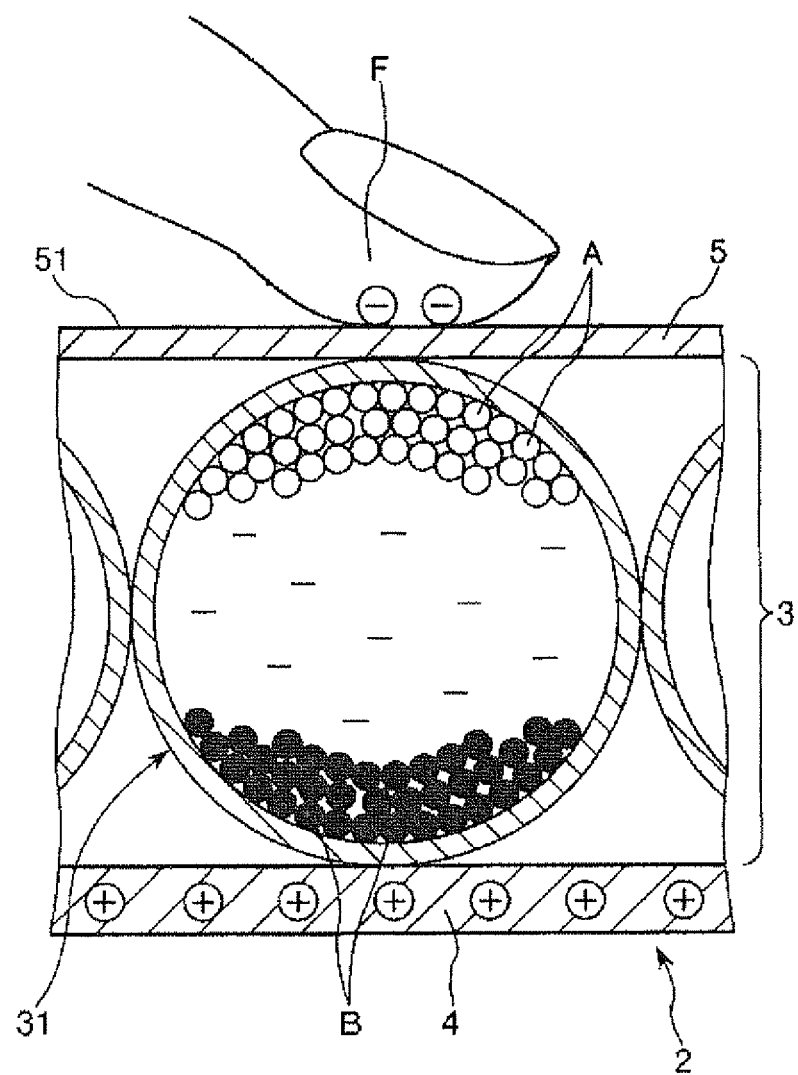
FIG. 11 is a partially enlarged view of FIG. 10.

FIG. 1 is a perspective view schematically showing an electronic device according to the first embodiment of the invention. FIG. 2 is a sectional view of a display sheet provided in the electronic device shown in FIG. 1. FIG. 3 is a sectional view showing a modification of a protective sheet provided in the display sheet shown in FIG. 2. FIG. 4 is a perspective view showing the partial section of a writing device provided in the electronic device shown in FIG. 1. FIG. 5 is a diagram showing the configuration of a switch provided in the writing device shown in FIG. 4. FIG. 6 is a diagram showing a state of writing an image on a display sheet. FIG. 7 is a partially enlarged view of FIG. 6. FIG. 8 is a diagram showing a display sheet on which a desired image is written. FIG. 9 is a diagram showing a state of writing an image on a display sheet. FIG. 10 is a diagram showing a state when erasing an image written on a display sheet. FIG. 11 is a partially enlarged view of FIG. 10. In the following explanation, for the sake of convenience, it is assumed that the upper side in FIG. 2 is "upper" and the lower side is "lower". Moreover, for convenience of explanation, a microcapsule 31 is shown in a very large size in FIG. 6. However, the size (size when compared with a user's hand) of the microcapsule 31 is largely different from the actual size. The same is true for other drawings.

An electronic device 1 shown in FIG. 1 has a display sheet 2 (display sheet of the invention) and a writing device 8 (writing device of the invention). This electronic device 1 is an apparatus capable of writing an image (for example, a character or a picture) corresponding to the locus of movement on the display sheet 2 when a user moves the writing device 8 on the display sheet 2 while gripping the writing device 8. In the electronic device 1, the display sheet 2 can be used as rewritable paper. Accordingly, the convenience of the electronic device 1 is improved.

Hereinafter, the configuration of the display sheet 2 and the configuration of the writing device 8 will be sequentially described in detail.

Display Sheet 2

The display sheet 2 is an electrophoretic display sheet which displays an image using the electrophoresis of electrophoretic particles.

As shown in FIG. 2, the display sheet 2 includes a display layer 3, an electrode layer 4 provided on the lower surface (first surface) of the display layer 3, and a protective sheet (protective film) 5 provided on the upper surface of the display layer 3. In the display sheet 2, the upper surface of the protective sheet 5 serves as a display surface 51. By viewing the display layer 3 through the display surface 51, a predetermined image can be recognized.

As shown in FIG. 2, the display layer 3 is formed by fixing (holding) a plurality of microcapsules (containing portions) 31 using binder 32. In addition, the plurality of microcapsules 31 is provided between the protective sheet 5 and the electrode layer 4 and in a single layer so as to be aligned in a matrix (one microcapsule 31 is provided in a thickness direction without overlapping).

The microcapsule 31 has a spherical capsule body (shell body) 311, and electrophoretic dispersion liquid is filled in the inside (internal space) of the microcapsule 31. By forming the microcapsule 31 in the spherical form, it is possible to obtain the microcapsule 31 excellent in resistance to pressure and anti-bleeding. As will be described later, therefore, even if a certain amount of external force (pressure force) is applied to the microcapsule 31 by pressing the display surface 51 using the writing device 8, the microcapsule 31 can soften and absorb the external force. As a result, breakage of the microcapsule 31 can be prevented.

Although the particle diameter (average particle diameter) of the microcapsule 31 is not particularly limited, it is preferable that the particle diameter is equal to or larger than about 10 μm and equal to or smaller than about 200 μm from the viewpoints of resolution, contrast ratio, and the like.

A constitutent material of the capsule body 311 is not particularly limited. For example, gelatin, a composite material of gum arabic and gelatin, and various resin materials involving urethane based resin, melamine based resin, urea resin, epoxy based resin, phenol based resin, acrylic based resin, urethane based resin, olefin based resin, polyamide, and polyether may be mentioned, and one or a combination of two or more of them may be used.

Electrophoretic dispersion liquid filled in the capsule body 311 is obtained by dispersing (suspending) a positively charged particle A and a negatively charged particle B, which has a different color from that of the positively charged particle A, in a liquid-phase dispersion medium 6. Dispersion of the positively charged particle A and the negatively charged particle B to the liquid-phase dispersion medium 6 may be performed using one or a combination of two or more of a paint shaker method, a ball mill method, a media mil method, an ultrasonic dispersion method, and a stirring dispersion method, for example.

As examples of the liquid-phase dispersion medium 6, aromatic hydrocarbons such as benzene hydrocarbon, paraffinic hydrocarbons such as n-hexane and n-decane, isoparaffinic hydrocarbons such as Isopar (available from Exxon Chemicals), olefin hydrocarbons such as 1-octene and 1-decene, aliphatic hydrocarbons such as naphthenic hydrocarbon, carbon hydride series compounds made of petroleum or derived from petroleum such as kerosene, petroleum ether, petroleum benzine, ligroin, industrial gasoline, and petroleum naphtha, halogen hydrocarbons such as dichloromethane and chloroform, silicone oils (organic silicone oils) such as dimethyl silicone oil and methylphenyl silicone oil, and fluorinated solvent (organic fluorinated solvent) such as hydrofluoroether are preferably used. Among these materials, organic silicone oil is more preferably used given the point that viscosity can be easily adjusted.

The positively charged particle A is an electrophoretic particle which has a white color and is positively charged. In addition, the negatively charged particle B is an electrophoretic particle which has a black color and is negatively charged. Thus, since white and black electrophoretic particles are contained in the microcapsule 31, black and white display of the display sheet 2 becomes possible. As a result, display contrast of the display sheet 2 is improved.

Although a white particle is used as the positively charged particle A and a black particle is used as the negatively charged particle B in the present embodiment, colors of the positively charged particle A and the negatively charged particle B are not particularly limited as long as the colors are different. For example, chromatic colors, such as red, blue, and green, or metal luster colors, such as gold and silver, may be appropriately selected according to the purpose. In addition, the combination of colors of the positively charged particle A and the negatively charged particle B are not limited to that described above. For example, it is also possible to adopt a combination in which the positively charged particle A is black and the negatively charged particle B is white, a combination in which the positively charged particle A is blue and the negatively charged particle B is red, and a combination in which the positively charged particle A is gold and the negatively charged particle B is silver.

Although the positively charged particle A and the negatively charged particle B are not particularly limited since any particle with an electric charge can be used, at least one of a pigment particle, a resin particle, and a composite particle thereof is preferably used. These particles are advantageous in that they can be easily manufactured and the amount of charging can be controlled relatively easily.

As examples of a pigment which forms a pigment particle, black pigments such as an aniline black pigment, a carbon black pigment, and a titanium black pigment, white pigments such as a titanium oxide pigment and an antimony oxide pigment, azo based pigments such as a monoazo pigment, yellow pigments such as an isoindolinone pigment and a chrome yellow pigment, red pigments such as a quinacridone pigment and a chrome vermilion pigment, blue pigments such as a phthalocyanine blue pigment and an indanthrene blue pigment, and green pigments such as a phthalocyanine green pigment may be mentioned, and one or a combination of two or more of them may be used.

Among those described above, as pigment particles, a titanium oxide particle is preferably used as a white particle (positively charged particle A) and a titanium black particle is preferably used as a particle (negatively charged particle B). Since the responsiveness to an electric field is high and the difference of reflectance is large, these particles make possible the high contrast display of the display sheet 2.

Moreover, as examples of a resin material which forms a resin particle, acrylic based resin, urethane based resin, urea based resin, epoxy based resin, polystyrene, and polyester may be mentioned, and one or a combination of two or more of them may be used.

Moreover, as examples of a composite particle, a particle obtained by coating the surface of a pigment particle with a resin material or another pigment, a particle obtained by coating the surface of a resin particle with a pigment, and a particle formed of a mixture in which a pigment and a resin material are mixed in the appropriate composition ratio may be mentioned.

As an example of a particle obtained by coating the surface of a pigment particle with another pigment, a particle obtained by coating the surface of a titanium oxide particle with silicon oxide or aluminum oxide may be mentioned.

Moreover, although not particularly limited, the shapes of the positively charged particle A and the negatively charged particle B are preferably spherical shapes.

Taking the dispersibility in the liquid-phase dispersion medium 6 into consideration, smaller particles are used more preferably as the positively charged particle A and the negatively charged particle B. Specifically, it is preferable that the average particle diameter is equal to or larger than about 0.1 μm and equal to or smaller than about 10 μm. More preferably, the average particle diameter is equal to or larger than about 0.1 μm and equal to or smaller than about 7.5 μm. By setting the average particle diameter of each of the positively charged particle A and the negatively charged particle B to fall within the above range, cohesion of the positively charged particle A and the negatively charged particle B or sinking of the positively charged particle A and the negatively charged particle B can be prevented. Accordingly, it is possible to maintain the state where the positively charged particle A and the negatively charged particle B are distributed in the liquid-phase dispersion medium 6. As a result, deterioration of the display quality of the display sheet 2 can be appropriately prevented.

In addition, when using two kinds of different particles (the positively charged particle A and the negatively charged particle B) like the present embodiment, it is preferable to set the average particle diameters of the two kinds of particles differently. In particular, it is preferable to set the average particle diameter of the white positively charged particle A to be larger than that of the black negatively charged particle B. In this case, it is possible to further improve the display contrast of the display sheet 2 or to improve the holding property.

Moreover, it is preferable that the specific gravity of each of the positively charged particle A and the negatively charged particle B is set to be almost equal to that of the liquid-phase dispersion medium 6. In this case, the positively charged particle A and the negatively charged particle B can stay at the fixed positions in the liquid-phase dispersion medium 6 for a long time even after the positively charged particle A and the negatively charged particle B are affected by the electric field, which will be described later.

The binder 32 is supplied to bond the electrode layer 4 and the protective sheet 5 to the display layer 3, to fix the plurality of microcapsules 31 between the electrode layer 4 and the protective sheet 5, and so on. Accordingly, durability and reliability of the display sheet 2 can be more improved.

A resin material, which is excellent in affinity (adhesiveness) with the electrode layer 4, the protective sheet 5, and the capsule body 311 and which is excellent in insulation, is preferably used for the binder 32. As examples of the binder 32, polyacrylonitrile, polyethylene, polypropylene, polyethylene terephthalate, polycarbonate, nylon 66, urethane based resin such as polyurethane, epoxide, polyimide, ABS resin, polyvinyl acetate, polymethacrylic acid methyle, polymethacrylic acid ethyl, polymethacrylic acid buthyl, methacrylic ester resin such as polymethacrylic acid octyl, vinyl chloride resin, cellulose based resin, silicon based resin, ethylene vinyl acetate copolymer, and the like may be mentioned, and one or a combination of two or more of them may be used.

The electrode layer 4 is provided on the lower surface (surface not facing the display surface 51) of the display layer 3 with such a configuration. The electrode layer 4 is provided so as to include the entire region of the display layer 3 in plan view of the display sheet 2. Moreover, as shown in FIG. 1, the electrode layer 4 has an exposed portion 41, which is exposed from the display layer 3, in plan view of the display sheet 2. As will be described later, the exposed portion 41 is a portion used when writing an image on the display surface 51 of the display sheet 2 or erasing a displayed (written) image.

As shown in FIG. 1, the exposed portion 41 is located at the corner of the display sheet 2. More specifically, the display layer 3 and the electrode layer 4 have almost the same rectangular shape in plan view of the display sheet 2, and one of the four corners of the display layer 3 is missing. The exposed portion 41 is formed by exposing the corner of the electrode layer 4 from the missing corner (portion). By forming the exposed portion 41 as described above, it is possible to form the exposed portion 41 easily and also to form the shape of the display sheet 2 in plan view as a simple shape with no protruding portion.

In addition, the number of exposed portions 41 is not particularly limited, and two or more exposed portions 41 may be provided. The arrangement of the exposed portion 41 is not particularly limited either, and the exposed portion 41 may not be located at the corner of the display sheet 2. For example, the exposed portion 41 may be provided so as to protrude from one side of the display sheet 2.

A constituent material of the electrode layer 4 is not particularly limited as long as it has a substantially conductive property. For example, various conductive materials involving metal materials such as copper, aluminum, or alloys containing these materials, carbon based materials such as carbon black, electron conductive polymer materials such as polyacetylene, polyfluorene, or derivatives of these materials, ion conductive polymer materials in which an ionic material such as NaCl or $Cu(CF_3SO_3)_2$ is dispersed in a matrix resin such as polyvinyl alcohol or poly carbonate, a conductive oxide material such as indium oxide (IO) may be mentioned, and one or a combination of two or more of them may be used.

On the other hand, the protective sheet 5 is provided on the upper surface of the display layer 3. The protective sheet 5 is formed of a sheet-shaped member with an insulation property. Such a protective sheet 5 has a function of protecting the display layer 3. In addition, the protective sheet 5 may be omitted as necessary.

The protective sheet 5 has a light transmission property in order to form the display surface 51. That is, the protective sheet 5 is substantially transparent (colorless and transparent, colored and transparent, or translucent). In this way, a state of the display layer 3, that is, an image (information) displayed on the display sheet 2 can be visually recognized from the display surface 51 side.

Although the protective sheet 5 may be flexible or hard, it is preferable that the protective sheet 5 is flexible. The display sheet 2 which is flexible can be obtained by using the flexible protective sheet 5. As a result, the convenience of the display sheet 2 is improved.

Examples of the constituent material when forming the protective sheet 5 with flexibility include polyolefin such as polyethylene, modified polyolefin, polyamide, thermoplastic polyimide, polyether, polyether ether ketone, and various kinds of thermoplastic elastomers such as polyurethane series and chlorinated polyethylene series. Moreover, copolymer, blended materials, polymer alloy and the like which contain the above materials as main materials may also be mentioned, and one or a combination of two or more of them may be used.

In order to prevent the malfunction of the display sheet 2 caused by static electricity, the protective sheet 5 may be made to have a static elimination function. In order to give such a function, the protective sheet 5 may be made to have the following configuration, for example. That is, a configuration in which metal particles, such as chromium (Cr) or molybdenum (Mo), are dispersed in the protective sheet 5 may be mentioned as one configuration. Moreover, as shown in FIG. 3, a configuration in which wiring lines 52 formed of a metal material, such as chromium (Cr) and molybdenum (Mo), are embedded in the protective sheet 5 may be mentioned as another configuration. By making the protective sheet 5 with such a configuration grounded, charge components in the protective sheet 5 can be removed.

Between the electrode layer 4 and the protective sheet 5, a sealing section 7 is provided along the edges. The display layer 3 is sealed airtightly by the sealing section 7. Since this prevents the permeation of moisture into the display sheet 2, deterioration of the display performance of the display sheet 2 can be prevented more reliably.

As examples of a constituent material of the sealing section 7, various kinds of resin materials involving thermoplastic resin, such as acrylic based resin, urethane based resin, and olefin based resin, and thermosetting resin, such as epoxy based resin, melamine based resin, and phenol based resin, may be mentioned, and one or a combination of two or more of them may be used. In addition, the sealing section 7 may be provided or omitted as necessary.

Writing Device 8

As shown in FIG. 4, the writing device 8 has a casing 81, a power supply 82, an electrode portion 83, and a conductive portion 84. Such a writing device 8 is used in order to write a desired image on the display sheet 2 as described above.

As shown in FIG. 4, the casing 81 has a pen form and is formed of a plastic material with an insulation property, for example. Thus, since the casing 81 is formed in the pen form, the writing device 8 can be operated (used) like writing materials, such as a pencil and a ball-point pen. As a result, it is possible to improve the operability (user-friendliness) of the writing device 8.

In addition, the casing 81 has a grip portion 811 for gripping the casing 81. The grip portion 811 is provided at the distal side (that is, a part corresponding to a grip portion of a writing material, such as a pencil or a ball-point pen) of the casing 81. The grip portion 811 may be formed integrally with the casing 81 or may be formed by coating an elastic tubular member, which is formed of a rubber material or the like, on the casing 81. When the grip portion 811 and the casing 81 are integrally formed, it does not matter whether the grip portion 811 can be distinguished or not by a change in the form, a difference in color, or the like.

At the distal end side of the casing 81 (that is, at the front side of the pen), the electrode portion 83 is provided so as to protrude from the casing 81. The electrode portion 83 is a portion which is in contact with and slides on the display surface 51 of the display sheet 2 when using the electronic device 1. By forming the electrode portion 83 so as to protrude from the casing 81 as described above, it is possible to make the electrode portion 83 come in contact with and slide on the display surface 51 more reliably.

Moreover, as shown in FIG. 4, the distal end (that is, a part which may come in contact with the display surface 51) of the electrode portion 83 is rounded. Accordingly, it is possible to prevent a situation in which the display surface 51 is damaged (scratched, broken) when the electrode portion 83 comes in contact with and slides on the display surface 51.

The area (area in contact with the display surface 51) of the electrode portion 83 is not particularly limited, and may be appropriately set according to the purpose. The smaller the area of the electrode portion 83 is, the finer the line can be drawn. In this case, a fine image can be written on the display sheet 2.

A constituent material of the electrode portion 83 is not particularly limited as long as it has a substantially conductive property. For example, the same materials as the electrode layer 4 of the display sheet 2 may be mentioned.

The conductive portion 84 which has a conductive property is provided in the grip portion 811 of the casing 81, and user's fingers come in contact with the conductive portion 84 when the user grips the grip portion 811. The conductive portion 84 is a portion which comes in contact with the display surface 51 of the display sheet 2 through the body (mainly, a hand) of the user. Thus, since the conductive portion 84 is provided in the grip portion 811, the user's body can come in contact with the conductive portion 84 reliably when the user grips the writing device 8. As a result, it is possible to reliably form closed circuits C1 and C2, which will be described later.

The configuration of the conductive portion 84 is not particularly limited. For example, a conductive portion 84 which has an annular shape may be provided to surround the periphery of the grip portion 811 like the present embodiment, or a configuration may be adopted in which a plurality of linear members extending in the axial direction of the casing 81 is provided and the plurality of linear members are arrayed along the peripheral direction of the grip portion 811 at equal distances therebetween. In addition, when the grip portion 811 is formed of a conductive material, the grip portion 811 may also serve as the conductive portion 84.

A constituent material of the conductive portion 84 is not particularly limited as long as it has a substantially conductive property. For example, the same materials as the electrode layer 4 of the display sheet 2 may be mentioned.

As shown in FIG. 4, the power supply 82, such as a battery, is housed in the casing 81. The electrode portion 83 is electrically connected to one electrode of the power supply, and the conductive portion 84 is electrically connected to the other electrode (in FIG. 4, a wiring line which connects the power supply 82 with the electrode portion 83 and a wiring line which connects the power supply 82 with the conductive portion 84 are not shown for convenience of explanation).

It may be determined as follows to which electrodes of the power supply 82 the electrode portion 83 and the conductive portion 84 are to be connected. That is, in order to draw a white character or picture on the black background, a cathode of the power supply 82 is connected to the electrode portion 83 and an anode is connected to the conductive portion 84. On the contrary, in order to draw a black character or picture on the white background, the anode of the power supply 82 is connected to the electrode portion 83 and the cathode is connected to the conductive portion 84.

The writing device 8 has a switch 86 capable of performing switching between a first state, in which the cathode of the power supply 82 is connected to the electrode portion 83 and the anode is connected to the conductive portion 84, and a second state, in which the anode of the power supply 82 is connected to the electrode portion 83 and the cathode is connected to the conductive portion 84. By providing such a switch, it can be easily selected whether to write a white character and the like or a black character and the like. Moreover, the writing device 8 may also be used as an erasing device (that is, an eraser) for erasing an image written on the display sheet 2, and this will be described later. That is, the convenience of the writing device 8 is further improved by providing the switch.

Although the configuration of the switch 86 is not particularly limited, it is possible to use the configuration as shown in FIG. 5, for example. The switch 86 with the configuration shown in FIG. 5 has two switching elements 861 and 862.

The switching element 861 has a terminal 861a electrically connected to the cathode of the power supply 82, a terminal 861b electrically connected to the anode of the power supply 82, a terminal 861c electrically connected to the electrode portion 83, and a lever 861d electrically connected to the terminal 861c. The lever 861d is movable to a state of being in contact with either one of the terminals 861a and 861b and a state of being in no contact with the terminals 861a or 861b.

Similarly, the switching element 862 has a terminal 862a electrically connected to the cathode of the power supply 82, a terminal 862b electrically connected to the anode of the power supply 82, a terminal 862c electrically connected to the conductive portion 84, and a lever 862d electrically connected to the terminal 862c. The lever 862d is movable to a state of being in contact with either one of the terminals 862a and 862b and a state of being in no contact with the terminals 862a or 862b.

Since the levers 861d and 862d move in association with each other in such a switch 86, it is possible to select a state where the lever 861d comes in contact with the terminal 861a and the lever 862d comes in contact with the terminal 862b (this state is the first state described above), a state where the lever 861d comes in contact with the terminal 861b and the lever 862d comes in contact with the terminal 862a (this state is the second state described above), and a state where the lever 861d is in contact with neither the terminal 861a nor the terminal 861b and the lever 862d is in contact with neither the terminal 862a nor the terminal 862b. Such selection (operation of the switch 86) may be performed using a button 85 which is provided so as to protrude from the casing 81, for example.

Moreover, the flow of current between the power supply 82 and the electrode portion 83 (conductive portion 84) can be stopped by setting the state where the lever 861d is in contact with neither the terminal 861a nor the terminal 861b and the lever 862d is in contact with neither the terminal 862a nor the terminal 862b. As a result, it is possible to prevent a malfunction or the like.

Usage of the Electronic Device 1

Next, how to use the electronic device 1 will be described with reference to FIGS. 6 to 10. In the following, the case where a black character or picture is drawn on the white background will be described as a representative example.

First, a user grips the writing device 8 in which the switch 86 is in the second state (state where the cathode of the power supply 82 is connected to the conductive portion 84 and the anode is connected to the electrode portion 83). Then, the user places the hand, which grips the writing device 8, on the display surface 51 in order to draw a desired character or picture on the display surface 51. As a result, the conductive portion 84 comes in contact with the display surface 51 through the user's hand. That is, the user's hand serves as a conductor path, such that the conductive portion 84 and the display surface 51 are electrically connected to each other. At the same time, the user makes the electrode portion 83 of the writing device 8 come in contact with the display surface 51 in order to write a desired character or the like. In this state, the closed circuit Cl shown in FIG. 6 is formed.

FIG. 7 is an enlarged sectional view near the electrode portion 83 in FIG. 6. As shown in FIG. 7, if the closed circuit Cl is formed, a voltage having a negative potential at the electrode portion 83 side and a positive potential at the electrode layer 4 side is applied from the power supply 82 and accordingly, an electric field having a negative potential at the electrode portion 83 side and a positive potential at the electrode layer 4 side is generated. When this electric field acts on the microcapsule 31 located between the electrode portion 83 and the electrode layer 4, the positively charged particle A within the microcapsule 31 is electrophoresed toward the electrode layer 4, which has a negative potential, while the negatively charged particle B is electrophoresed toward the electrode portion 83, which has a positive potential.

By the electrophoresis of the positively charged particle A and the negatively charged particle B, the positively charged particle A is unevenly distributed at the electrode layer 4 side and the negatively charged particle B is unevenly distributed at the electrode portion 83 side in the microcapsule 31 located between the electrode portion 83 and the electrode layer 4, as shown in FIG. 7. Accordingly, the microcapsule 31 located between the electrode portion 83 and the electrode layer 4 is in a black display state.

Thus, by selecting the electrophoresis of the positively charged particle A and the negatively charged particle B for every microcapsule 31, the desired information (image) can be displayed on the display surface 51 of the display sheet 2 on the basis of reflected light obtained by the positively charged particle A and the negatively charged particle B.

For example, if the writing device 8 is moved so as to trace the display surface 51 while applying a voltage between the electrode layer 4 and the electrode portion 83 in a state where the entire region of the display surface 51 is in a white display state, the microcapsule 31 located on the orbit of the writing device 8 changes to a black display state. As a result, a black line corresponding to the orbit of the writing device 8 is drawn on the display surface 51. In this manner, for example, an image as shown in FIG. 8 can be drawn. Moreover, as described above, in each microcapsule 31 of the display sheet 2, the states of the positively charged particle A and the negatively charged particle B can be maintained for a long period of time even after the electric field acted on the microcapsule 31. Accordingly, the above-described image writing is possible.

Moreover, when there are two or more lines or points which begin to be written from the different positions on the display surface 51, for example, like characters "X" and "Y", it is preferable to cut off the flow of current between the power supply 82 and the electrode portion 83 by operating the switch 86 while moving the writing device 8 from the end point of a predetermined line to the starting point of the next line. In this way, unintended writing on the display sheet 2 can be prevented effectively.

Although the case where the hand, which grips the writing device 8, is placed on the display surface 51 has been described in the above writing method, the writing method is not limited to this, and a part of the user's body may be in contact with the display surface 51. This is because the closed circuit Cl can be formed through the contact portion if a part of the user's body is in contact with the display surface 51. Therefore, for example, when writing a desired character or the like on the display sheet 2 in a state (non-contact state) where the user's hand, which grips the writing device 8, is floated above the display surface 51, it is preferable to place the hand opposite to the hand which grips the writing device 8 on the display surface 51.

Alternatively, a writing method shown in FIG. 9 may be used. That is, the user may make the electrode portion 83 of the writing device 8, in which the switch 86 is in the second state, come in contact with the display surface 51 while floating the hand which grips the writing device 8 above the display surface 51 (maintaining a non-contact state) in a state where a hand (ball of a finger) F which does not grip the writing device 8 is in contact with the exposed portion 41.

Also in such a method, the closed circuit C1 may be formed using the user's body as a path.

In this method, electrophoresis of the positively charged particle A and the negatively charged particle B in the other microcapsule 31, which is different from the microcapsule 31 located immediately below the electrode portion 83, can be prevented, unlike the method shown in FIG. 6. Accordingly, unintended image writing or erasing on the display surface 51 can be reliably prevented. In addition, although not shown in FIG. 9, a hand which grips the writing device 8 and a hand (ball F of a finger) which touches the exposed portion 41 are electrically connected to each other through the user's body.

In the above, the writing method on the display sheet 2 has been described. On the other hand, how to erase an image written on the display sheet 2 will be described below.

First, the writing device 8, in which the switch 86 is in the second state, is gripped and then the electrode portion 83 of the writing device 8 is contacted with the exposed portion 41 of the display sheet 2. Then, a portion such as a character displayed on the display surface 51, which needs to be erased, is touched by the hand (ball of a finger) F which does not grip the writing device 8, for example. In this state, the closed circuit C2 shown in FIG. 10 is formed. In addition, although not shown in FIG. 10, a hand which grips the writing device 8 and the hand (ball F of a finger) which touches the display surface 51 are electrically connected to each other through the user's body.

FIG. 11 is an enlarged sectional view near the ball F of the finger in FIG. 10. As shown in FIG. 11, if the closed circuit C2 is formed, a voltage having a negative potential at the ball F side of the finger and a positive potential at the electrode layer 4 side is applied from the power supply 82 and accordingly, an electric field having a negative potential at the ball F side of the finger and a positive potential at the electrode layer 4 side is generated. When this electric field acts on the microcapsule 31 located between the ball F of the finger and the electrode layer 4, the positively charged particle A within the microcapsule 31 is electrophoresed toward the ball F of the finger, which has a negative potential, while the negatively charged particle B is electrophoresed toward the electrode layer 4, which has a positive potential.

By the electrophoresis of the positively charged particle A and the negatively charged particle B, the positively charged particle A is unevenly distributed at the ball F side of the finger and the negatively charged particle B is unevenly distributed at the electrode layer 4 side in the microcapsule 31 located between the ball F of the finger and the electrode layer 4, as shown in FIG. 11. Accordingly, the microcapsule 31 located between the electrode portion 83 and the electrode layer 4 is in a white display state.

Thus, all or part of characters or the like displayed on the display surface 51 can be erased by making the microcapsule 31, which is located between the ball F of the finger and the electrode layer 4, have a white color which is a background color. Particularly in the present embodiment, since the electrode layer 4 has the exposed portion 41, the electrode portion 83 of the writing device 8 and the electrode layer 4 can be contacted more closely with each other. Accordingly, all or a part of characters or the like displayed on the display surface 51 can be erased.

In addition, it is preferable to set the strength of a voltage, which is applied between the electrode layer 4 and the electrode portion 83 when erasing an image, to be larger than that of a voltage applied between the electrode layer 4 and the electrode portion 83 when writing an image. In this case, erasing of an image (switching of a display color) can be quickly performed. In particular, since the finger F tends to move quickly when erasing an image, incomplete erasing of an image can be effectively prevented by adopting such a configuration.

In addition, the following method may be mentioned as another method of erasing an image written on the display sheet 2.

For example, the writing device 8 in which the switch 86 is in the first state (state where the cathode of the power supply 82 is connected to the electrode portion 83 and the anode is connected to the conductive portion 84) is gripped. In this state, if a portion which needs to be erased on the display surface 51 is traced with the writing device 8 (electrode portion 83) in the same manner as in the writing method shown in FIG. 6 or 9, an electric field with a negative potential at the electrode portion 83 and a positive potential at the electrode layer 4 acts on the microcapsule 31 corresponding to the traced portion. Then, the positively charged particle A and the negatively charged particle B are electrophoresed, such that the positively charged particle A is unevenly distributed at the electrode portion 83 side and the negatively charged particle B is unevenly distributed at the electrode layer 4 side. Accordingly, an image of the portion traced with the writing device 8 (electrode portion 83) can be erased. According to the above-described method, an image in a narrower range can be erased.

In the above, the electronic device 1 has been described in detail. In such an electronic device 1, the writing device 8 is not wired with the display sheet 2, that is, the writing device 8 is wireless. Accordingly, since a desired image can be written on the display surface 51 smoothly (without being disturbed by the wiring line) using the writing device 8, the convenience is noticeably improved. In addition, the device configurations of the writing device 8 and the display sheet 2, which form the electronic device 1, can be made simple as described above.

Here, responsiveness of display color switching of each microcapsule 31 can be adjusted by appropriately adjusting the thickness of the protective sheet 5 provided in the display sheet 2. That is, if the protective sheet 5 is made thick, the gap distance between the electrode portion 83 and the electrode layer 4 increases. Accordingly, since the electric field generated between the electrode portion 83 and the electrode layer 4 becomes weak, the responsiveness of display color switching of each microcapsule 31 can be set slow by the weakened electric field. On the contrary, if the protective sheet 5 is made thin, the gap distance between the electrode portion 83 and the electrode layer 4 decreases. Accordingly, since the electric field generated between the electrode portion 83 and the electrode layer 4 becomes strong, the responsiveness of display color switching of each microcapsule 31 can be set fast by the strengthened electric field. Accordingly, the display sheet 2 which has responsiveness suitable for the purpose can be obtained. In addition, adjustment of the thickness of the protective sheet 5 may also be performed by superimposing the plurality of protective sheets 5, for example.

Second Embodiment

Next, a second embodiment of an electronic device (electronic device of the invention), to which a writing device of the invention and a display sheet of the invention are applied, will be described.

Figure 12:
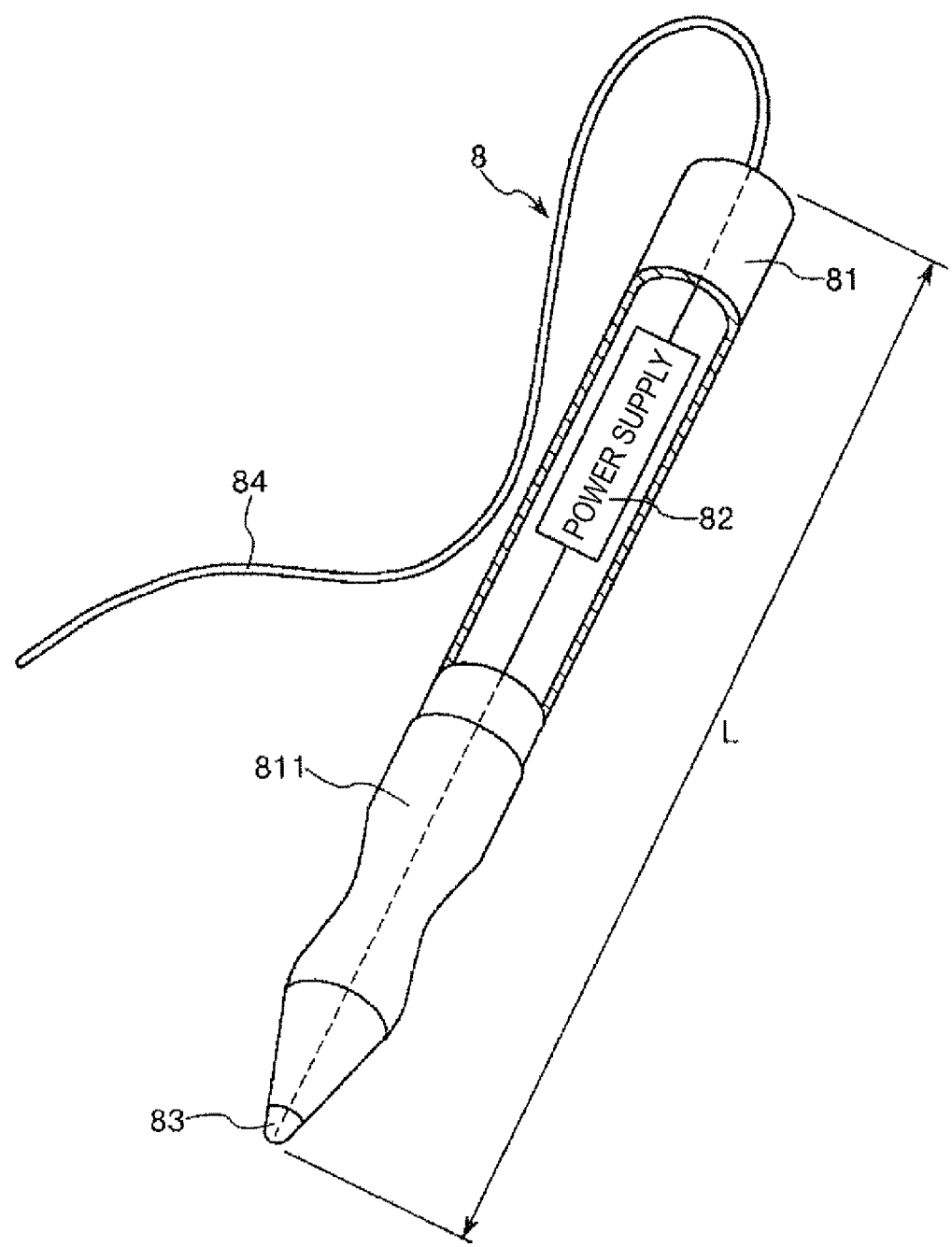
FIG. 12 is a diagram showing a writing device provided in an electronic device according to a second embodiment of the invention.
Figure 13:
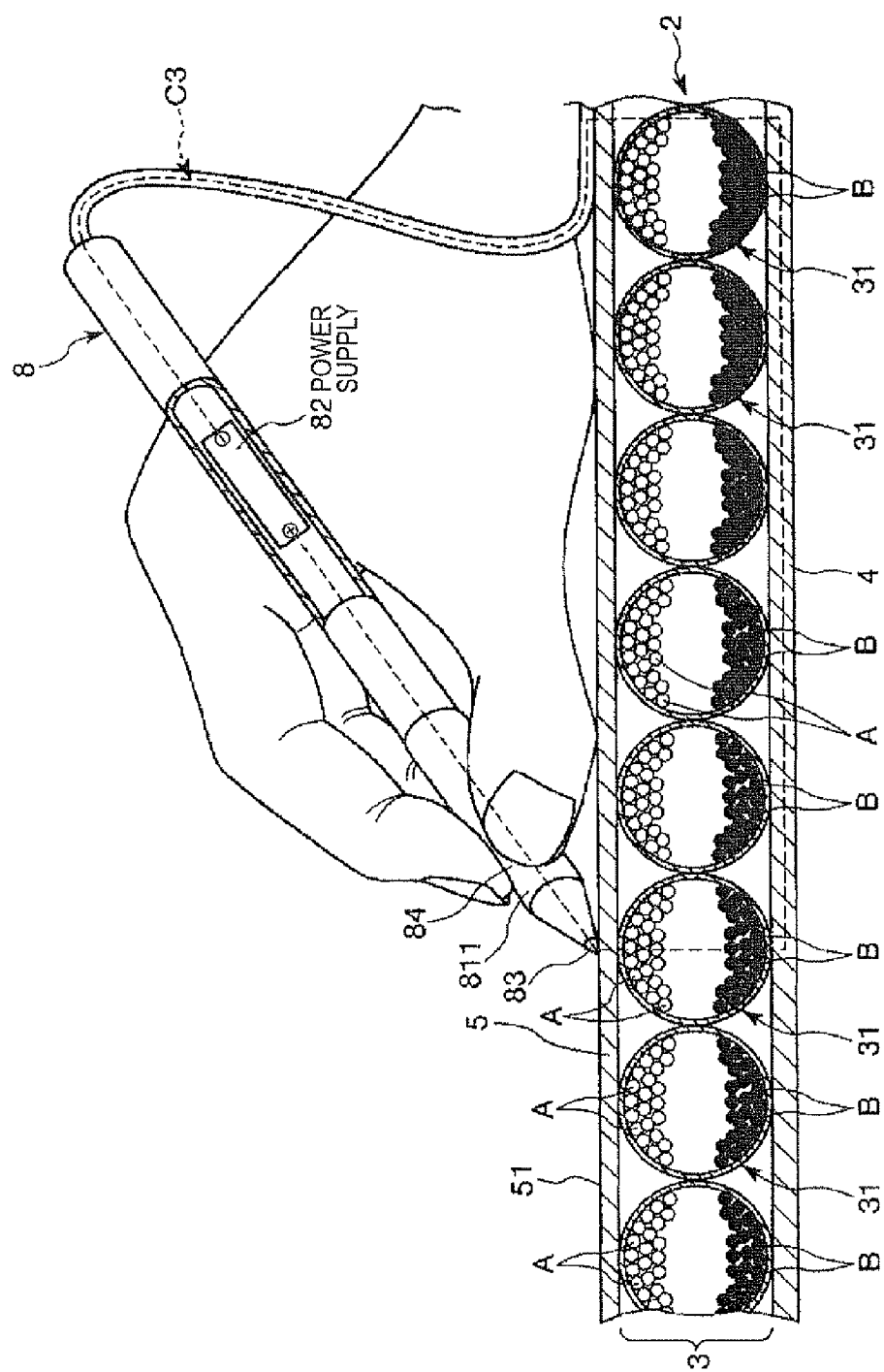
FIG. 13 is a diagram showing a state of writing an image on a display sheet.
Figure 14:
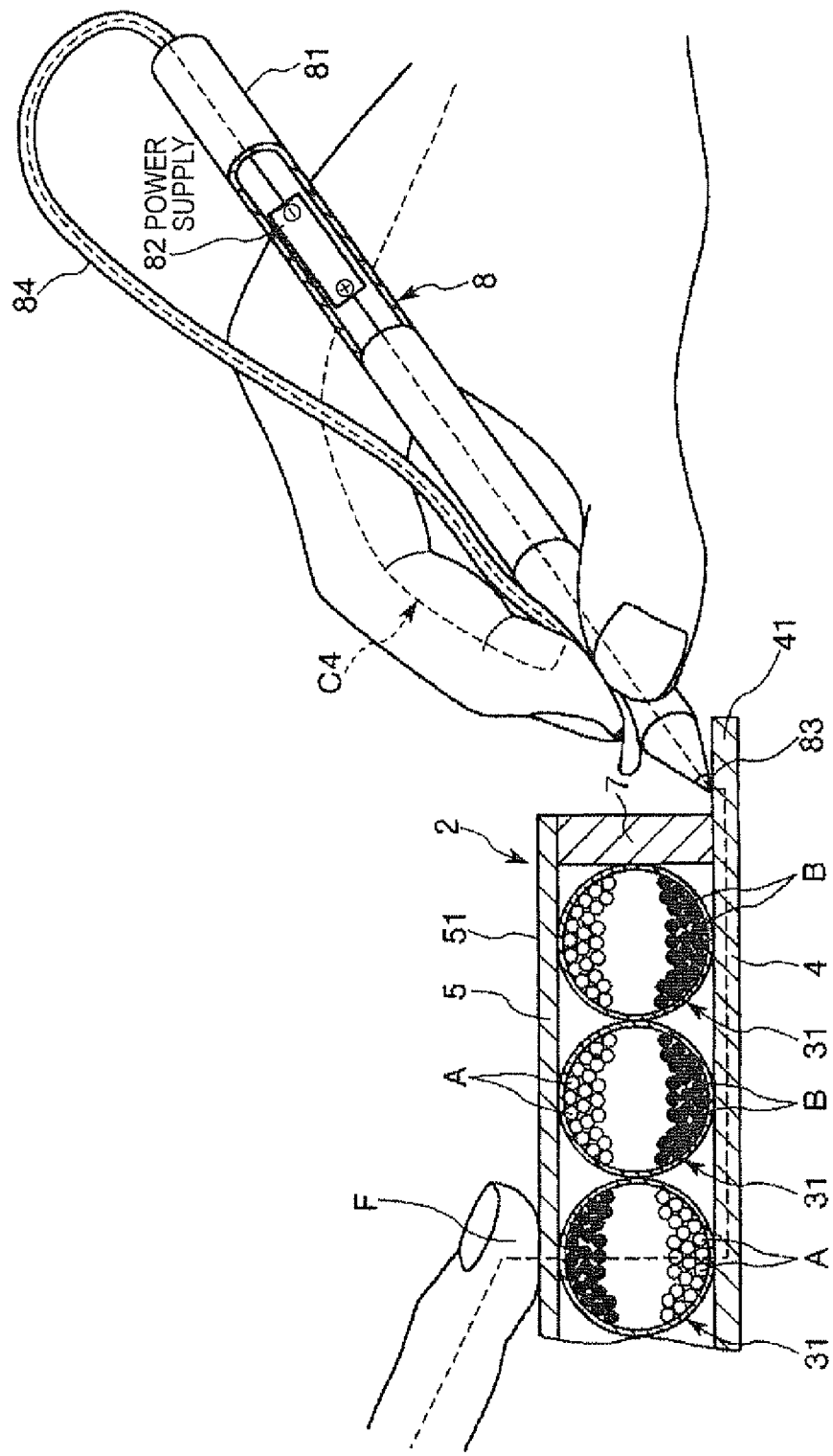
FIG. 14 is a diagram showing a state when erasing an image written on a display sheet.

FIG. 12 is a diagram showing a writing device provided in an electronic device according to a second embodiment of the invention. FIG. 13 is a diagram showing a state of writing an image on a display sheet. FIG. 14 is a diagram showing a state of erasing an image written on the display sheet.

Hereinafter, the electronic device according to the second embodiment will be described. This explanation will be focused on a point of difference from the above embodiment, and explanations of the same matters will be omitted.

The electronic device according to the present embodiment has the same configuration as the first embodiment except that the configuration of the conductive portion 84 provided in the writing device 8 is different.

As shown in FIG. 12, the conductive portion 84 has a string form, and the tip is a free end. By forming the conductive portion 84 in such a form, the conductive portion 84 hangs down by its own weight when the user grips the writing device 8 and locates the electrode portion 83 on the display surface 51 and accordingly, the conductive portion 84 can come in direct contact with the display surface 51. This will be described later. In addition, since the tip of the conductive portion 84 is a free end, it is possible to smoothly operate the writing device 8 without causing a situation where the conductive portion 84 is entangled with the casing 81 during the operation of the writing device 8.

In addition, the conductive portion 84 extends from the rear end of the casing 81. Thus, by extending the conductive portion 84 from the rear end of the casing 81, it is possible to suppress a situation where the conductive portion 84 is caught on or entangled with a hand which holds the writing device 8. Therefore, the conductive portion 84 can be made to be in contact with the display surface 51 more reliably, as described above.

Although the length of the conductive portion 84 is not particularly limited, the length of the conductive portion 84 may be approximately equal to the length of the casing 81, or it is preferable that the length of the conductive portion is longer than the length of the casing 81. More specifically, assuming that the length of the casing 81 is L, it is preferable that the length of the conductive portion 84 is equal to or larger than L and equal to or smaller than about 1.2 L. When the user grips the writing device 8 and locates the electrode portion 83 on the display surface 51, the writing device 8 is generally inclined with respect to the vertical direction. Accordingly, it is possible to reliably make the conductive portion 84 come in contact with the display surface 51 by setting the lower limit of the length of the conductive portion 84 to the above length. Moreover, it is possible to prevent the conductive portion 84 from becoming longer than needed by setting the upper limit of the length of the conductive portion 84 to the above length.

Usage of the Electronic Device 1

Next, how to use the electronic device 1 will be described with reference to FIGS. 13 to 14. In the following, similar to the first embodiment described above, the case where a black character or picture is drawn on a white background will be described as a representative example.

First, a user grips the writing device 8 in which the switch 86 is in the second state. Then, the user locates the writing device 8 on the display surface 51 in order to draw a desired character or picture on the display surface 51. In this case, since the conductive portion 84 hangs down by its own weight, the distal end of the conductive portion 84 comes in direct contact with the display surface. Then, the user makes the electrode portion 83 of the writing device 8 come in contact with the display surface 51 in order to write a desired character or the like. In this state, a closed circuit C3 shown in FIG. 13 is formed. By moving the writing device 8 in a state where the closed circuit C3 is formed, a character or a picture corresponding to the locus of the writing device 8 can be written on the display sheet 2, similar to the first embodiment described above.

When erasing a character or the like written on the display sheet 2, for example, the casing 81 of the writing device 8 in which the switch 86 is in the second state is gripped together with the conductive portion 84 (that is, the writing device 8 is gripped such that the conductive portion 84 is in contact with the user's body), and the electrode portion 83 of the writing device 8 is contacted with the exposed portion 41 of the display sheet 2. Then, a portion such as a character displayed on the display surface 51, which needs to be erased, is touched by the hand (ball of a finger) F which does not grip the writing device 8, for example. In this state, a closed circuit C4 shown in FIG. 14 is formed (although not shown in FIG. 14, the hand which grips the writing device 8 and the hand (ball F of a finger) which touches the display surface 51 are electrically connected to each other through the user's body). By moving the ball F of the finger in such a state where the closed circuit C4 is formed, a character or a picture of a portion corresponding to the ball F of the finger can be erased in the same manner as in the first embodiment described above.

Also in the second embodiment, the same effects as in the first embodiment can be achieved.

Third Embodiment

Next, a third embodiment of an electronic device (electronic device of the invention), to which a writing device of the invention and a display sheet of the invention are applied, will be described.

Figure 15:
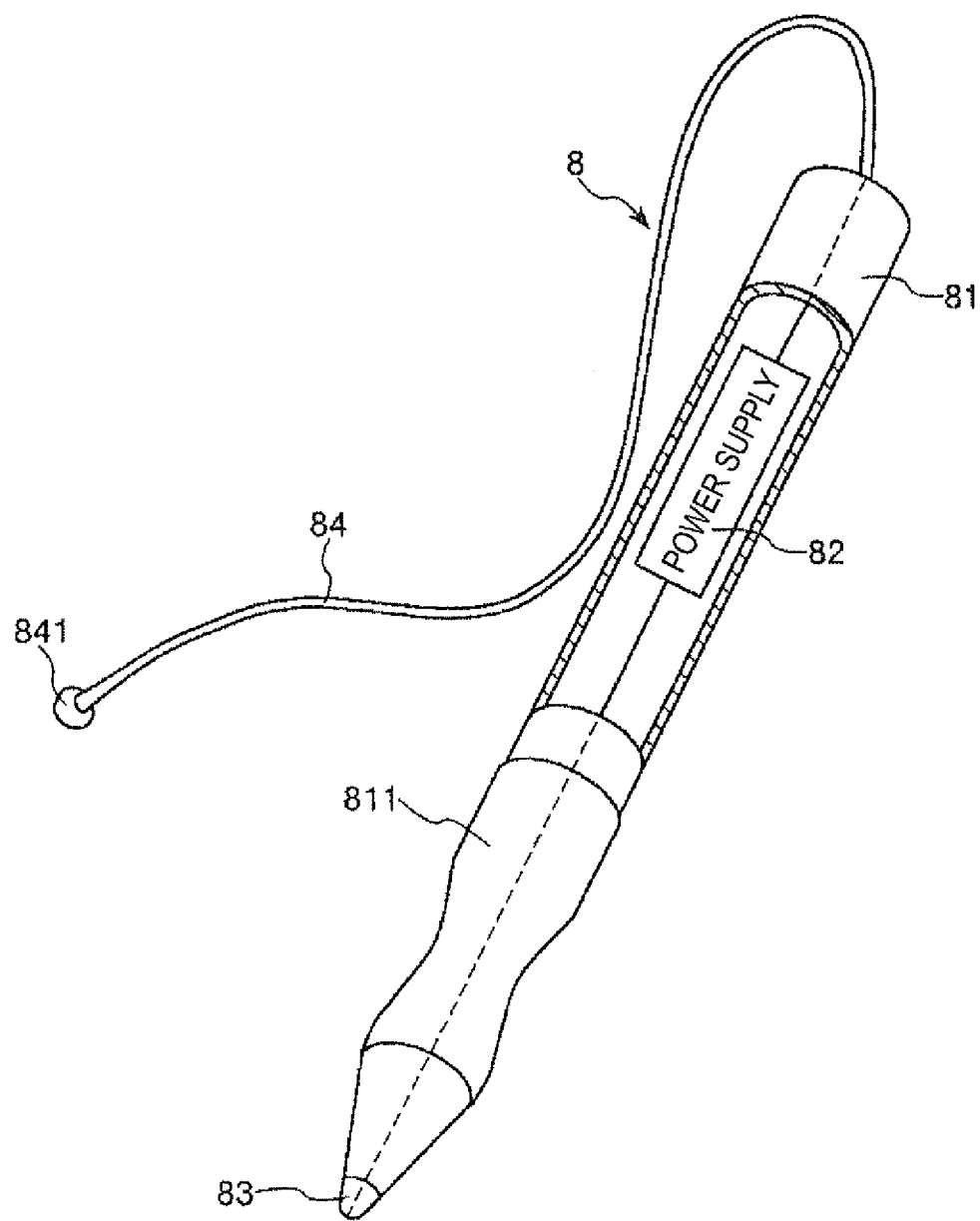
FIG. 15 is a diagram showing a writing device provided in an electronic device according to a third embodiment of the invention.

FIG. 15 is a diagram showing a writing device provided in an electronic device according to the third embodiment of the invention.

Hereinafter, the electronic device according to the third embodiment will be described. This explanation will be focused on a point of difference from the above embodiment, and explanations of the same matters will be omitted.

The electronic device according to the present embodiment has the same configuration as the second embodiment except that the configuration of the conductive portion 84 provided in the writing device 8 is different.

As shown in FIG. 15, the conductive portion 84 has a string form. In addition, the conductive portion 84 has a weight member 841 which is provided at the tip and has a conductive property. By providing the weight member 841, a state where the conductive portion 84 is in contact with the display surface 51 can be maintained more reliably. For example, it is possible to prevent a situation where the conductive portion 84 comes away from the display surface 51 when the conductive portion 84 moves on the display surface 51 according to the operation of the writing device 8. Therefore, a desired image can be more reliably displayed on the display sheet 2.

Moreover, although not particularly limited, it is preferable that the weight of the weight member 841 is equal to or larger than about 10 mg and equal to or smaller than about 100 mg. By setting the weight of the weight member 841 to such weight, the state where the conductive portion 84 is in contact with the display surface 51 can be maintained more reliably. In addition, it can be prevented that the microcapsule 31 in the display layer 3 is broken due to the weight when the weight member 841 is placed on the display surface 51. In addition, when the writing device 8 (casing 81) has been moved, the weight member 841 can also be moved easily according to the movement. Accordingly, the writing device 8 can be smoothly operated.

Also in the third embodiment, the same effects as in the first embodiment can be achieved.

Fourth Embodiment

Next, a fourth embodiment of an electronic device (electronic device of the invention), to which a writing device of the invention and a display sheet of the invention are applied, will be described.

Figure 16:
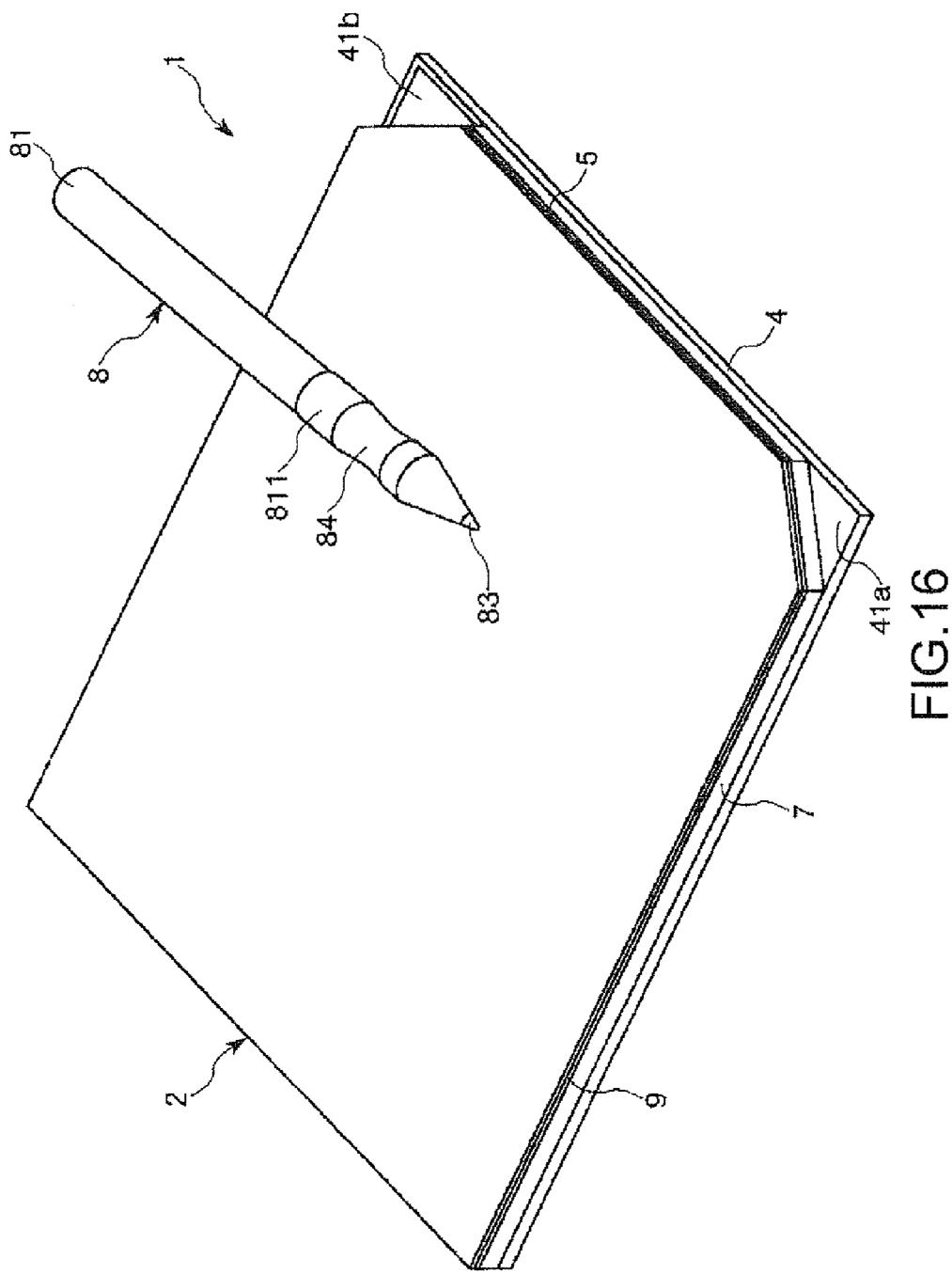
FIG. 16 is a perspective view showing an electronic device according to a fourth embodiment of the invention.
Figure 17:
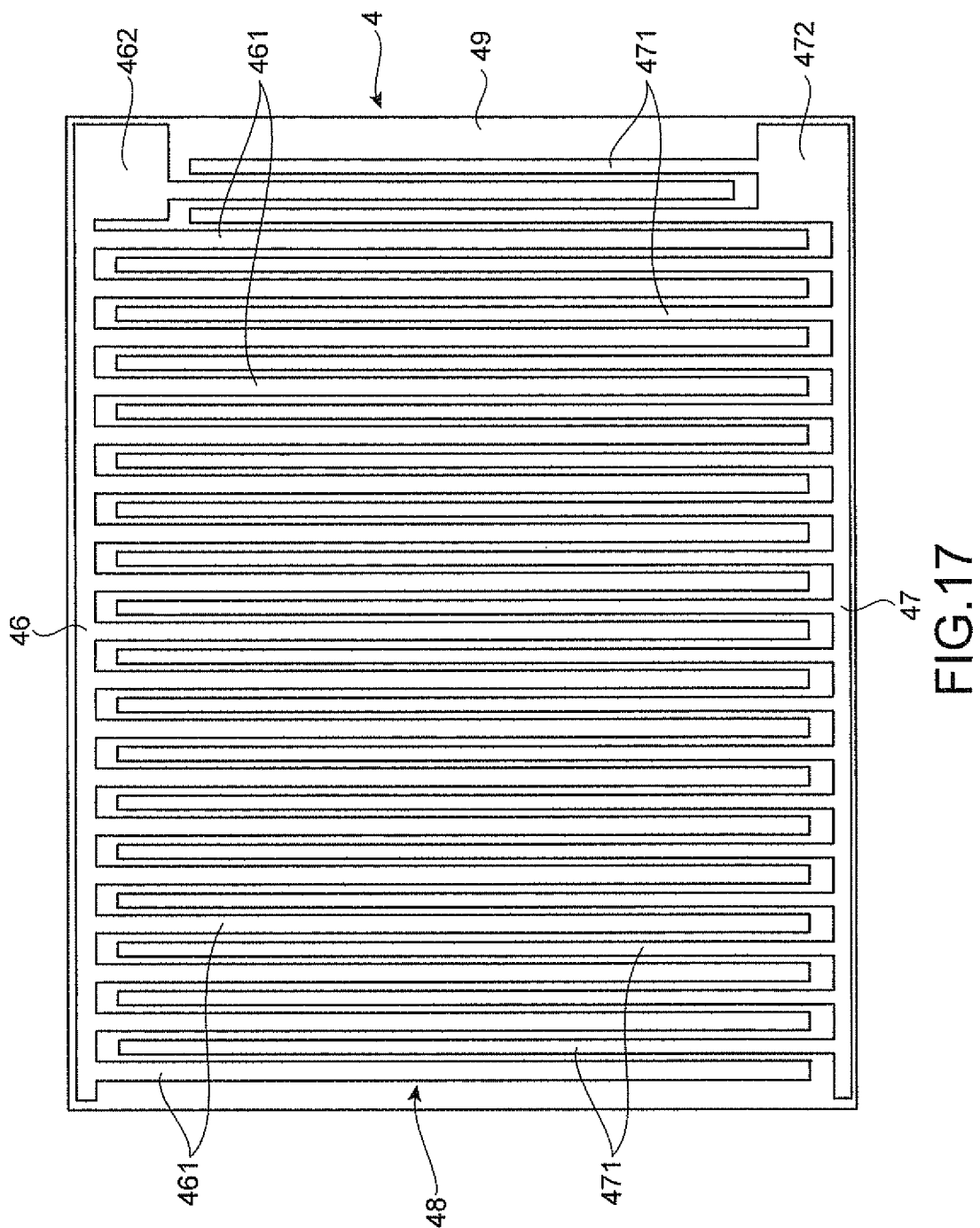
FIG. 17 is a plan view of an electrode layer of a display sheet shown in FIG. 16.
Figure 18:
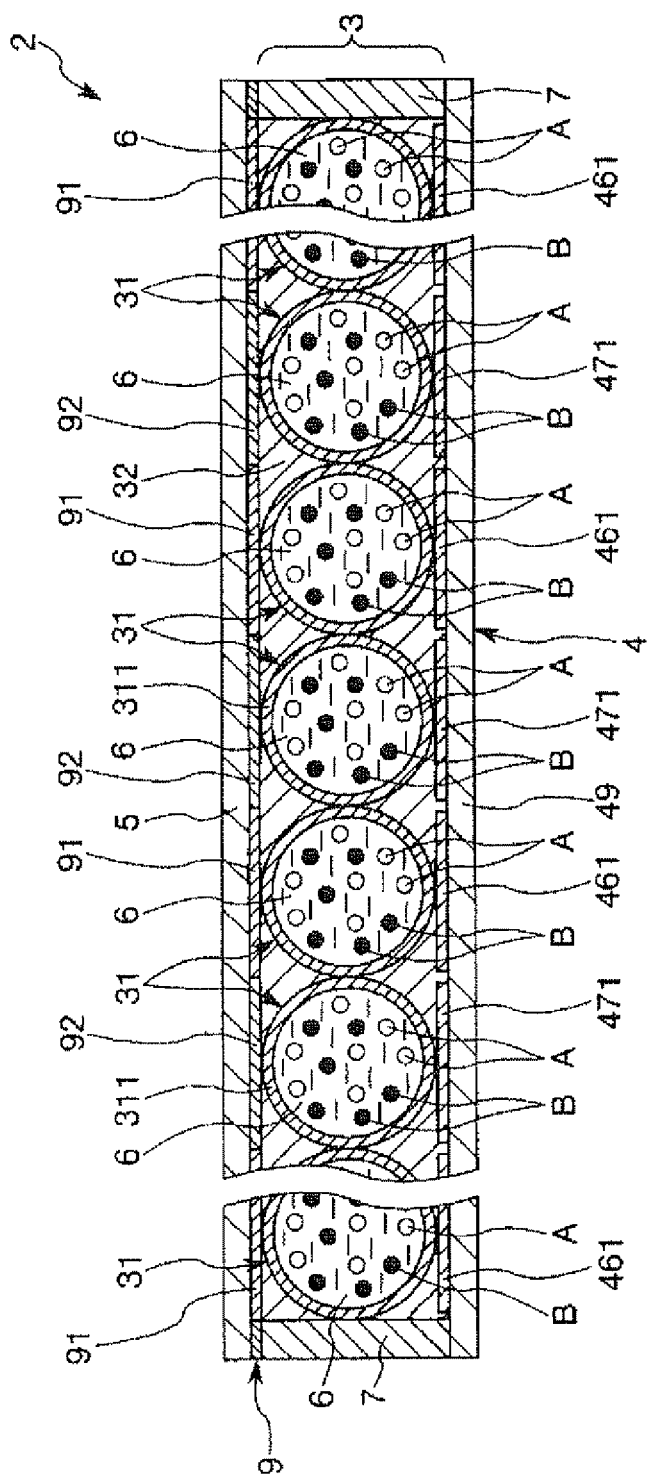
FIG. 18 is a sectional view of the display sheet shown in FIG. 16.

FIG. 16 is a perspective view showing an electronic device according to a fourth embodiment of the invention. FIG. 17 is a plan view of an electrode layer of a display sheet shown in FIG. 16. FIG. 18 is a sectional view of the display sheet shown in FIG. 16.

Hereinafter, the electronic device according to the fourth embodiment will be described. This explanation will be focused on a point of difference from the above embodiment, and explanations of the same matters will be omitted.

The electronic device according to the present embodiment has the same configuration as the first embodiment except that the configuration of a display sheet is different.

On the display sheet 2 provided in the electronic device 1 according to the present embodiment, not only black and white display but also color display is possible. Hereinafter, the display sheet 2 of the present embodiment will be described in detail.

As shown in FIG. 16, the electrode layer 4 has two exposed portions 41a and 41b.

Moreover, as shown in FIG. 17, the electrode layer 4 has a base 49 and an interdigital electrode 48, which is provided on a surface of the base 49 facing the display layer 3.

The base 49 is formed of a sheet-shaped member with an insulation property. Although the protective sheet 5 may be flexible or hard, it is preferable that the protective sheet 5 is flexible. The display sheet 2 which is flexible can be obtained by using the flexible base 49.

Examples of the constituent material when forming the base 49 with flexibility include polyolefin such as polyethylene, modified polyolefin, polyimide, thermoplastic polyimide, polyether, polyether ether ketone, and various kinds of thermoplastic elastomers such as polyurethane series and chlorinated polyethylene series. Moreover, copolymer, blended materials, polymer alloy and the like which contain the above materials as main materials may also be mentioned, and one or a combination of two or more of them may be used.

The interdigital electrode 48 is provided on one surface (surface facing the display layer 3) of the base 49. The interdigital electrode 48 is configured to include a pair of electrodes 46 and 47 insulated from each other. The pair of electrodes 46 and 47 are disposed such that an electrode finger 471 of the electrode 47 engages with an electrode finger 461 of the electrode 46.

Moreover, the electrode 46 has a pad 462 electrically connected to each electrode finger 461, and a part of the pad 462 is exposed from an exposed portion 41b to the outside of the display sheet 2. Similarly, the electrode 47 has a pad 472 electrically connected to each electrode finger 471, and a part of the pad 472 is exposed to the outside of the display sheet 2.

As shown in FIGS. 16 and 18, the display sheet 2 has a colored layer 9 between the display layer 3 and the protective sheet 5. The colored layer 9 has a colored portion 91, which is colored and transparent, and a transparent portion 92, which is substantially colorless and transparent. Although the color of the colored portion 91 is not particularly limited, it is preferably a chromatic color, such as red, blue, and green. In this case, color display on the display sheet 2 becomes possible. For convenience of explanation, the case where the colored portion 91 is red will be described below as a representative example.

The colored portion 91 and the transparent portion 92 each have a strip form and are alternately arrayed. Moreover, as shown in FIG. 18, the colored portion 91 is provided so as to face the electrode finger 461 of the electrode 46, and the transparent portion 92 is provided so as to face the electrode finger 471 of the electrode 47.

Although the colored layer 9 is not particularly limited, for example, a color filter may be appropriately used.

Moreover, in the display sheet 2 of the present embodiment, one microcapsule 31 is located between one electrode finger 461 and the colored portion 91 in the horizontal direction in FIG. 18. However, the plurality of microcapsules 31 may be located without being limited to those described above. The same is true for between one electrode finger 471 and the transparent portion 92.

The electronic device 1 which has the display sheet 2 with such a configuration may be used as follows. In the following, the case where a white or red character or picture is drawn on the black background (that is, the case where all microcapsules 31 are in the black display state) will be described as a representative example.

Black and White Display

A user grips the writing device 8, in which the switch 86 is in the first state (state where the anode of the power supply 82 is connected to the conductive portion 84 and the cathode is connected to the electrode portion 83), in a state where the hand (ball of a finger) F which does not grip the writing device 8 is in contact with the exposed portion 41b (pad 472). Then, the electrode portion 83 of the writing device 8 is contacted with the display surface 51 in a state where the hand which grips the writing device 8 is floated above the display surface 51. Then, if the writing device 8 is moved so as to trace the display surface 51, the microcapsule 31, which is located on the orbit of the writing device 8 and also located on the electrode 47 (electrode finger 471), changes to a white display state. As a result, a white line corresponding to the orbit of the writing device 8 is drawn on the display surface 51. In this case, since the electric field does not act on the microcapsule 31, which is located on the electrode 46, among the microcapsules 31 located on the orbit of the writing device 8, the display color of the microcapsule 31 is not changed.

Red Display (Color Display)

A user grips the writing device 8, in which the switch 86 is in the first state, in a state where the hand (ball of a finger) F which does not grip the writing device 8 is in contact with the exposed portion 41a (pad 462). Then, the electrode portion 83 of the writing device 8 is contacted with the display surface 51 in a state where the hand which grips the writing device 8 is floated above the display surface 51. Then, if the writing device 8 is moved so as to trace the display surface 51, the microcapsule 31, which is located on the orbit of the writing device 8 and also located on the electrode 46 (electrode finger 461), changes to a white display state. When the light reflected from the microcapsule 31 which has changed to the white display state is transmitted through the colored portion 91, a red line corresponding to the orbit of the writing device 8 is drawn on the display surface 51. In this case, since the electric field does not act on the microcapsule 31, which is located on the electrode 47, among the microcapsules 31 located on the orbit of the writing device 8, the display color of the microcapsule 31 is not changed.

Thus, according to the electronic device 1 of the present embodiment, a color image can be written on the display sheet 2. Moreover, as described above, even if an image or a character is written with a red line after writing an image or a character with a white line, a white line written previously does not disappear. Accordingly, the convenience is noticeably improved.

In addition, although the configuration where the colored layer 9 has the transparent portion 92 is adopted in the present embodiment, a colored portion, which is colored with a different color from the colored portion 91, may be provided instead of the transparent portion 92. Moreover, although the configuration where the colored layer 9 has the colored portion 91 and the transparent portion 92 is adopted in the present embodiment, the colored layer 9 may further have a colored portion which is colored with another color. Moreover, for example, when the colored layer 9 has three regions of a first colored portion, a second colored portion, and a transparent portion, it is preferable that the electrode layer 4 is configured to have three electrodes corresponding to the regions.

In addition, the protective sheet 5 may be omitted depending on the strength or the like of the colored layer 9.

Fifth Embodiment

Next, a fifth embodiment of an electronic device (electronic device of the invention), to which a writing device of the invention and a display sheet of the invention are applied, will be described.

Figure 19:
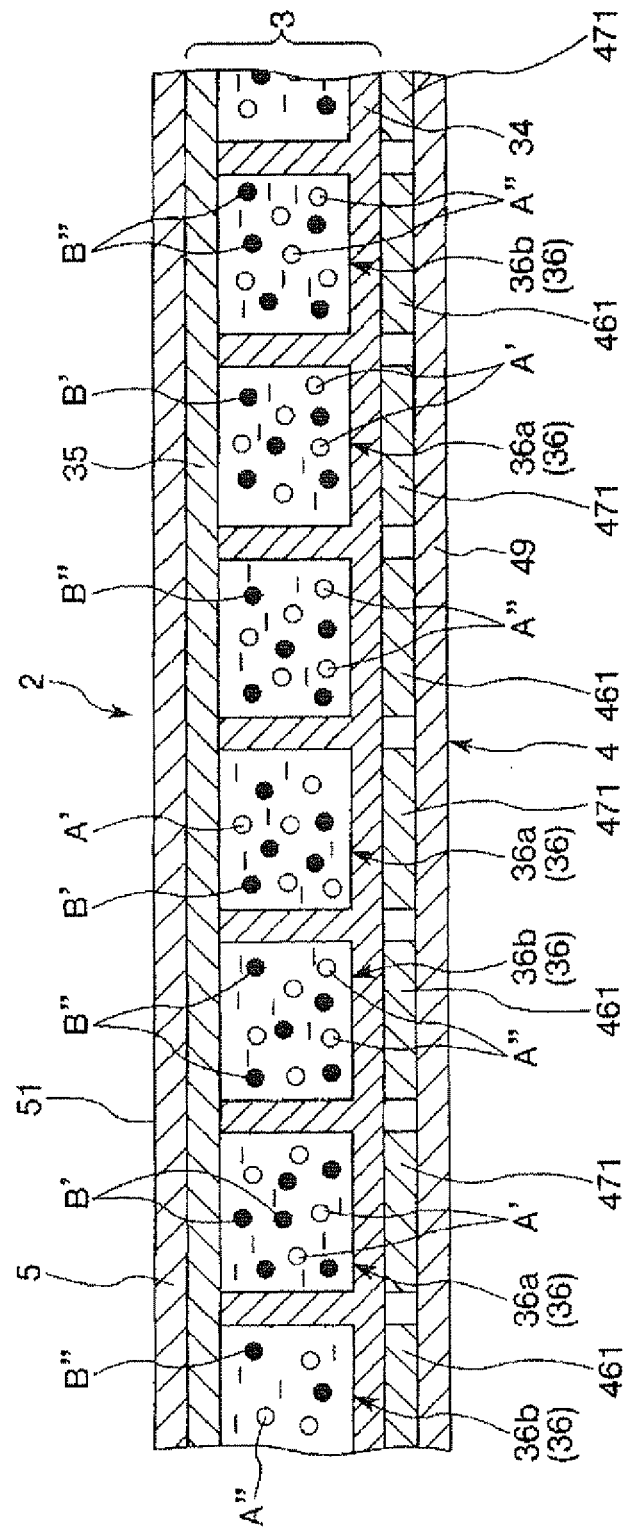
FIG. 19 is a sectional view of a display sheet provided in an electronic device according to a fifth embodiment of the invention.

FIG. 19 is a sectional view of a display sheet provided in an electronic device according to the fifth embodiment of the invention.

Hereinafter, the electronic device according to the fifth embodiment will be described. This explanation will be focused on a point of difference from the above embodiment, and explanations of the same matters will be omitted.

The electronic device according to the present embodiment has the same configuration as the fourth embodiment except that a colored layer of a display sheet is not provided and the configuration of a display layer is different.

On the display sheet 2 provided in the electronic device 1 according to the present embodiment, not only black and white display but also color display is possible. Hereinafter, the display sheet 2 of the present embodiment will be described in detail.

As shown in FIG. 19, the display layer 3 is not of a microcapsule type unlike the above embodiments, but is of a cell type in which a plurality of chambers is formed by partition walls.

Specifically, the display layer 3 has a plurality of cells (containing portions) 36 arrayed in a matrix, and electrophoretic dispersion liquid is filled in each cell 36.

The display layer 3 has a box body 34, which has a plurality of recesses (portions each of which becomes an internal space of each cell 36), and a lid 35 provided so as to cover an opening of each recess of the box body 34. The display layer 3 may be formed by filling each of the recesses, which are formed in the box body 34, with electrophoretic dispersion liquid and then sealing it with the lid 35.

As constituent materials of the box body 34 and the lid 35, materials with a relatively high insulation property may be used. For example, polyolefin such as polyethylene, modified polyolefin, polyamide, thermoplastic polyimide, polyether, polyether ether ketone, and various kinds of thermoplastic elastomers such as polyurethane series and chlorinated polyethylene series may be mentioned. Moreover, copolymer, blended materials, polymer and the like which contain the above materials as main materials may also be mentioned.

Among the plurality of cells 36 included in the display layer 3, a positively charged particle A' with a white color and a negatively charged particle B' with a black color are contained in the electrophoretic dispersion liquid filled in a cell 36a located on the electrode 47 (electrode finger 471) of the electrode layer 4, and a positively charged particle A" with a white color and a negatively charged particle B" with a red color are contained in the electrophoretic dispersion liquid filled in a cell 36b located on the electrode 46 (electrode finger 461).

The electronic device 1 which has the display sheet 2 with such a configuration may be used as follows. In the following, the case where a black or red character or picture is drawn on the white background (that is, the case where all cells 36 are in the white display state) will be described as a representative example.

White and Black Display

A user grips the writing device 8, in which the switch 86 is in the second state (state where the anode of the power supply 82 is connected to the electrode portion 83 and the cathode is connected to the conductive portion 84), in a state where the hand (ball of a finger) F which does not grip the writing device 8 is in contact with the exposed portion 41b (pad 472). Then, the electrode portion 83 of the writing device 8 is contacted with the display surface 51 in a state where the hand which grips the writing device 8 is floated above the display surface 51. Then, if the writing device 8 is moved so as to trace the display surface 51, the cell 36a, which is located on the orbit of the writing device 8 and also located on the electrode 47 (electrode finger 471), changes to a black display state. As a result, a black line corresponding to the orbit of the writing device 8 is drawn on the display surface 51. In this case, since the electric field does not act on the cell 36b, which is located on the electrode 46, among the cells 36 located on the orbit of the writing device 8, the display color of the cell 36b is not changed.

Red Display (Color Display)

A user grips the writing device 8, in which the switch 86 is in the second state, in a state where the hand (ball of a finger) F which does not grip the writing device 8 is in contact with the exposed portion 41a (pad 462). Then, the electrode portion 83 of the writing device 8 is contacted with the display surface 51 in a state where the hand which grips the writing device 8 is floated above the display surface 51. Then, if the writing device 8 is moved so as to trace the display surface 51, the cell 36b, which is located on the orbit of the writing device 8 and also located on the electrode 46 (electrode finger 461), changes to a red display state. As a result, a red line corresponding to the orbit of the writing device 8 is drawn on the display surface 51. In this case, since the electric field does not act on the cell 36a, which is located on the electrode 47, among the cells 36 located on the orbit of the writing device 8, the display color of the cell 36a is not changed.

Thus, according to the electronic device 1 of the present embodiment, a color image can be written on the display sheet 2. Moreover, as described above, even if an image or a character is written with a red line after writing an image or a character with a white line, the white line written previously does not disappear. Accordingly, the convenience is noticeably improved.

In the present embodiment, the cell 36a, in which the positively charged particle A' with a white color and the negatively charged particle B' with a black color are received, and the cell 36b, in which the positively charged particle A" with a white color and the negatively charged particle B" with a red color are received, are provided. However, the colors of the positively charged particles A' and A" and the negatively charged particles B' and B" are not limited thereto. For example, a combination of colors of the positively charged particles A' and the negatively charged particles B' may be (white, blue), (blue, red), or (green, blue). The same is true for a combination of colors of the positively charged particle A" and the negatively charged particle B".

The electronic device described above may be assembled into various kinds of electronic apparatuses. Examples of the electronic apparatus including the electronic device may include electronic papers, electronic books, television sets, view-finder-type or monitor-direct-view-type video tape recorders, car navigation systems, pagers, electronic organizers, calculators, electronic newspapers, word processors, personal computers, workstations, video phones, POS terminals, and apparatuses having a touch panel.

While the writing device, the display sheet, and the electronic device according to the embodiments of the invention shown in the drawings have been described, the invention is not limited to these. For example, in the writing device, the display sheet, and the electronic device according to the embodiments of the invention, the configuration of each section may be replaced with an arbitrary configuration with the same function, and an arbitrary configuration may be added. In addition, the above-described embodiments may also be appropriately combined.

What is claimed is:

1. A writing device for displaying an image on a display layer having a containing portion in which electrophoretic particles are contained, the writing device comprising:
    a casing;
    a power supply provided in the casing;
    an electrode portion which is provided in the casing and is electrically connected to the power supply in order to provide power from the power supply; and
    a conductive portion which is provided in the casing and is electrically connected to the power supply in order to provide power from the power supply,
    wherein display of the image is performed by electrically connecting the electrode portion to the display layer so that the conductive portion is electrically connected to the display layer.

2. The writing device according to claim 1,
    wherein the casing is of a pen type.

3. The writing device according to claim 1,
    wherein the electrode portion is formed at a distal end of the casing.

4. The writing device according to claim 1,
    wherein the electrode portion is electrically connected to one electrode of the power supply, and
    the conductive portion is electrically connected to the other electrode of the power supply.

5. The writing device according to claim 1,
    wherein the casing has a grip portion for gripping the casing, and
    the conductive portion is provided in the grip portion so as to come in contact with a user's fingers when a user grips the grip portion.

6. The writing device according to claim 1,
    wherein the conductive portion has a string form, and at least a part of the conductive portion comes in contact with the display layer.

7. A display sheet on which an image is displayed by a writing device having a casing, a power supply provided in the casing, an electrode portion which is provided in the casing and is electrically connected to the power supply in order to provide power from the power supply, and a conductive portion which is provided in the casing and is electrically connected to the power supply in order to provide power from the power supply, the display sheet comprising:
    a display layer which has a containing portion, in which electrophoretic particles are contained, and which has a first surface and a second surface facing the first surface; and
    an electrode layer provided on the first surface of the display layer,
    wherein the electrode layer has an exposed portion exposed from the display layer in plan view of the display layer.

8. The display sheet according to claim 7,
    wherein the display layer has a plurality of corners in plan view of the display layer and at least one of the plurality of corners is missing, and
    the exposed portion is provided so as to protrude from the missing portion in plan view of the display layer.

9. An electronic device comprising:
    a display sheet having an electrode layer and a display layer, which is provided on the electrode layer and has a containing portion in which electrophoretic particles are contained; and
    a writing device having a casing, a power supply provided in the casing, an electrode portion which is provided in the casing and is electrically connected to the power supply in order to provide power from the power supply, and a conductive portion which is provided in the casing and is electrically connected to the power supply in order to provide power from the power supply,
    wherein display of an image on the display layer is performed by electrically connecting the electrode portion to the display layer so that the conductive portion is electrically connected to the display layer.

* * * * *